United States Patent
Pitio

(10) Patent No.: US 7,349,411 B2
(45) Date of Patent: Mar. 25, 2008

(54) ECONOMICALLY EXPANSIBLE SWITCHING NETWORK

(75) Inventor: Walter Michael Pitio, Morganville, NJ (US)

(73) Assignee: Bay Microsystems, Inc., San Jose, CA (US)

( * ) Notice: Subject to any disclaimer, the term of this patent is extended or adjusted under 35 U.S.C. 154(b) by 936 days.

(21) Appl. No.: 10/630,420

(22) Filed: Jul. 30, 2003

(65) Prior Publication Data

US 2005/0025044 A1 Feb. 3, 2005

(51) Int. Cl.
*H04L 12/28* (2006.01)

(52) U.S. Cl. .................................. 370/400; 370/422

(58) Field of Classification Search ............. 370/389, 370/422–425; 359/123–124, 135–136
See application file for complete search history.

(56) References Cited

U.S. PATENT DOCUMENTS 5,459,724 A * 10/1995 Jeffrey et al. ............... 370/398
6,741,615 B1 * 5/2004 Patwardhan et al. ........ 370/514
6,798,784 B2 * 9/2004 Dove et al. .................. 370/463
7,197,031 B2 * 3/2007 Betts et al. .................. 370/367

* cited by examiner

*Primary Examiner*—Chi Pham
*Assistant Examiner*—Thai Hoang

(57) ABSTRACT

A telecommunications switching node comprising a plurality of input and output (I/O) ports configured to receive and transmit telecommunications signals, a switching core comprising a plurality of switching networks and a backplane connecting each of the plurality of I/O ports to each of the switching networks in the switching core. A non-blocking path is provided for each communications signal from any of the input ports to any of the output ports via one of the switching networks in the switching core. Further, the switching system effects a non-blocking path via all of the switching networks in the switching core. Advantageously, the switching core comprises a pair of switching networks. Further, this telecommunications switching node is expandable by adding a second switching core comprising a pair of switching networks to the node. One or more of the plurality of I/O ports may include a switching network to effect connection through the backplane to both pairs of switching networks.

17 Claims, 18 Drawing Sheets

ECONOMICALLY EXPANSIBLE SWITCHING NETWORK

FIELD OF THE INVENTION

The present invention relates to the field of telecommunications, and, more specifically, to an upgradeable architecture for a composite add/drop multiplexor, which is commonly used in high-speed backbone networks (e.g., SONET/SDH networks, etc.).

BACKGROUND OF THE INVENTION

In the not-too-distant past, there were relatively few telecommunications networks. These telecommunications networks supported a limited assortment of end-user equipment with electro-mechanical switching systems interconnected with copper wire. In recent years, however, there has been an explosive growth in demand for telecommunications services that employ a wide variety of new end-user equipment This demand quickly exceeded the capacity of the copper networks and electro-mechanical switching systems. To meet this demand, service providers old and new turned to optical fiber systems interconnected by computer-controlled (electronic) switching systems.

Today, high-capacity optical fiber networks are increasingly exploited in both public and private telephone and data networks. In the early stages of optical fiber networks, however, deployment was limited to high-revenue-generating applications. This limited deployment was due to communications-equipment manufacturers making network components using unique, proprietary architectures. The result of which, of course, was that the network components from one manufacturer did not work with other manufacturers' network components. An operating company implementing an early optical fiber network had to purchase most, if not all, of its network components from one manufacturer.

In order to provide inter-operability among components from the various manufacturers (and thus lower costs to the operating companies), Bellcore established a standard for connecting one optical fiber component or system to another. That standard is officially named the "Synchronous Optical Network," but is more commonly called "SONET." The international version of the standard is officially named the "Synchronous Digital Hierarchy," but it is more commonly called "SDH."

Although differences exist between SONET and SDH, those differences are mostly in terminology. In most respects, the two standards are the same and, therefore, virtually all equipment that complies with either the SONET standard or the SDH standard also complies with the other. Therefore, for the purposes of this specification, the SONET standard and the SDH standard shall be considered interchangeable and the acronym/initialism "SONET/SDH" shall be defined as either the Synchronous Optical Network standard or the Synchronous Digital Hierarchy standard, or both.

SUMMARY OF THE INVENTION

A technical advance is achieved in the art of SONET/SDH switching by an expandable switching node that can provide non-blocking switching of telecommunications signals in an initial configuration having one switching core. Further, the switching node is configured to be expandable to handle double the original capacity by adding only one additional switching core. Then, as capacity demand increases, I/O ports are added or replaced with high-capacity I/O ports. Each high-capacity I/O port includes a switching network that can connect telecommunications signals through one or both of the switching cores. A backplane is provided to connect I/O ports to one or more switching cores whether at maximum capacity or at initial capacity.

Thus, a telecommunications switching node according to an exemplary embodiment of this invention comprises a plurality of input and output (I/O) ports configured to receive and transmit telecommunications signals, a switching core comprising a plurality of switching networks and a backplane connecting each of the plurality of I/O ports to each of the switching networks in the switching core. This exemplary embodiment of this invention provides a non-blocking path for each communications signal from any of the input ports to any of the output ports via one or more of the switching networks in the switching core. Advantageously, the switching core comprises a pair of switching networks.

This telecommunications switching node of this exemplary embodiment is expandable by adding a second switching core comprising a pair of switching networks to the node. Further, one or more of the plurality of I/O ports may include a switching network to effect connection through the backplane to both pairs of switching networks.

BRIEF DESCRIPTION OF THE DRAWINGS

A more complete understanding of the invention can be obtained from a consideration of the specification in conjunction with the drawings, in which.

DETAILED DESCRIPTION

Figure 1:
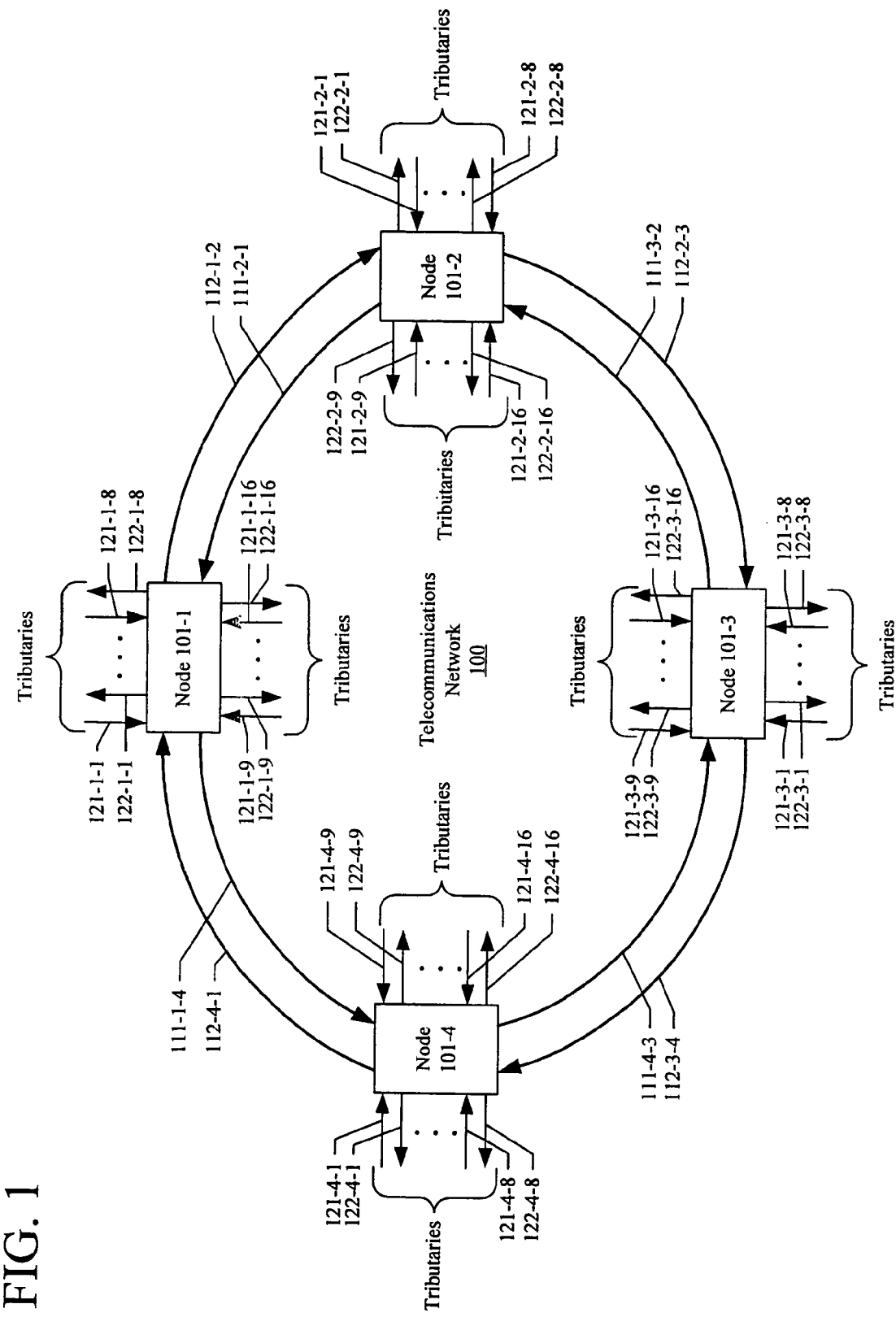
FIG. 1 depicts a block diagram of an application of an illustrative embodiment of the present invention in the context of a SONET/SDH ring.

FIG. 1 depicts a block diagram of an illustrative embodiment of the present invention, in the context of telecommunications network 100, which is a SONET/SDH ring network operating as a bidirectional line switched ring ("BLSR"). Telecommunications network 100 comprises four nodes, nodes 101-1 through 101-4, in accordance with the illustrative embodiment of this invention, which are interconnected by two sets of optical fibers, each of which carries an OC-768. Therefore, each node comprises two OC-768 line inputs and two OC-768 line outputs.

Although the illustrative embodiment uses SONET/SDH protocol, it will be clear to those skilled in the art how to make and use embodiments of the present invention that use other protocols. Although the illustrative embodiment is a ring network, it will be clear to those skilled in the art how to make and use embodiments of the present invention in which some or all of the nodes are interconnected in a mesh topology or non-ring network. Although the illustrative embodiment operates as a BLSR, it will be clear to those skilled in the art how to make and use embodiments of the present invention that operate in a different fashion (e.g., as a unidirectional path switched ring, as a four-fiber ring, etc.). Although the illustrative embodiment comprises four nodes, it will be clear to those skilled in the art how to make and use embodiments of the present invention that comprise a different number of nodes. Although the illustrative embodiment carries OC-768 SONET/SDH frames, it will be clear to those skilled in the art how to make and use embodiments of the present invention that carry other SONET/SDH frames.

As shown in FIG. 1, node 101-$i$, for i=1 to 4, is capable of receiving 16 OC-192 tributaries, 121-$i$-1 through 121-$i$-16, and of spawning 16 OC-192 tributaries, 122-$i$-1 through 122-$i$-16. Although each node in the illustrative embodiment comprises the same number of tributaries, it will be clear to those skilled in the art how to make and use embodiments of the present invention in which some or all of the nodes have a different number of tributaries. Although each tributary operates at an OC-192 data rate, it will be clear to those skilled in the art how to make and use embodiments of the present invention in which some of the tributaries have a different data rate (e.g., OC-48, OC-12, OC-3, etc.).

In accordance with the illustrative embodiment of the present invention, node 101-$i$ is capable of functioning as an add/drop multiplexor and
 i. a switch, or
 ii. a time-slot interchanger, or
 both i and ii.

In functioning as an add/drop multiplexor, node 101-$i$ is capable of:
 i. adding an STS-1 from any tributary to one or more lines, or
 ii. dropping an STS-1 from a line to one or more tributaries, or
 both i and ii.

In functioning as a switch, node 101-$i$ is capable of routing any STS-1 from any line or tributary to:
 i. one or more lines, or
 ii. one or more tributaries,
 both i and ii.

Because node 101-$i$ is capable of receiving a signal from one tributary and switching or copying it onto another tributary, and because this is an important aspect of the illustrative embodiment, it is given the name "hairpinning." For the purposes of this specification, the term "hairpinning" is defined as the receipt by a node of a signal on one tributary and the outputting of the signal onto another tributary.

In functioning as a time-slot interchanger, node 101-$i$ is capable of moving or copying any STS-1 from any time slot in any line or tributary to one or more other time slots.

Figure 2:
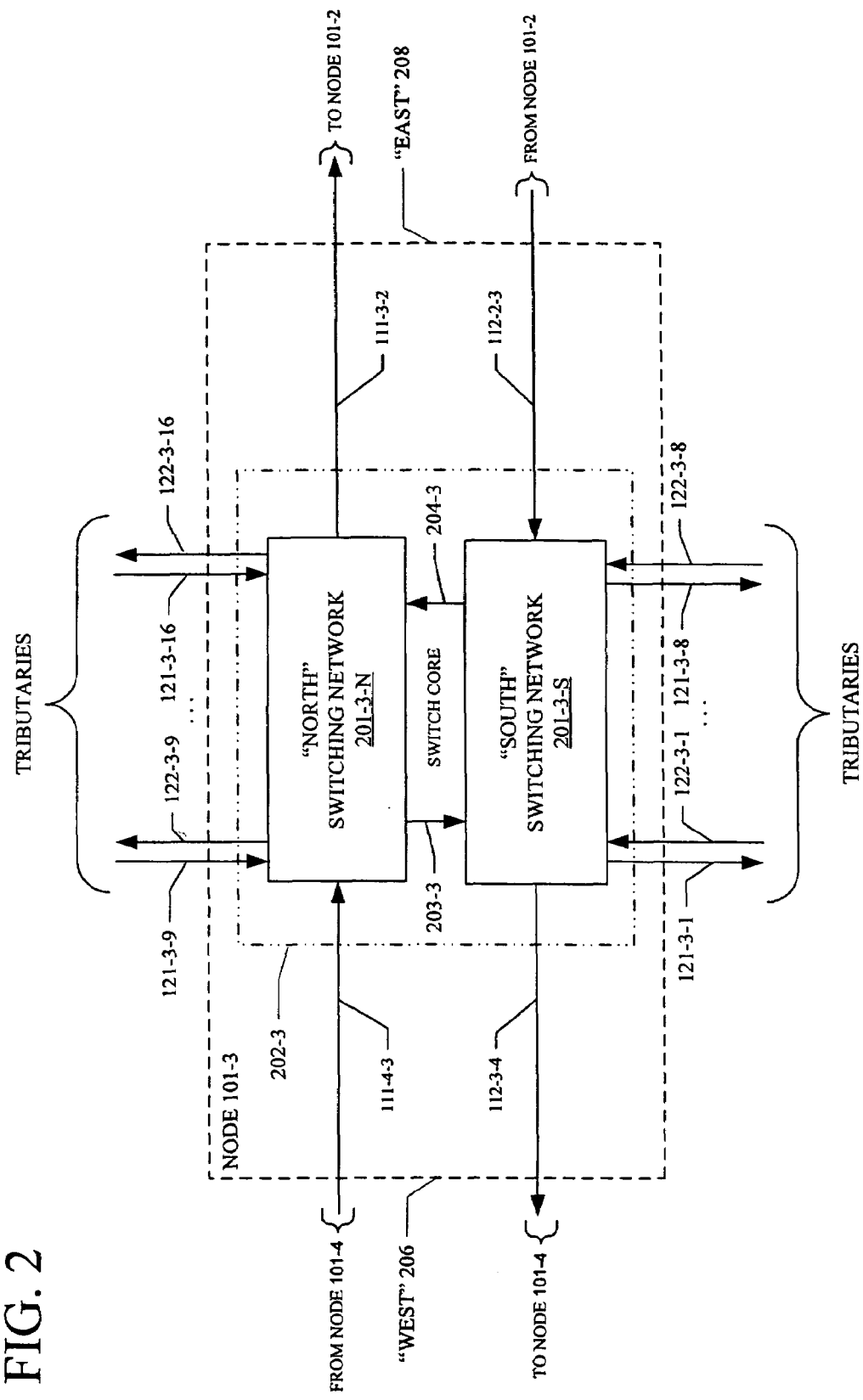
FIG. 2 depicts a logical block diagram of a switching node of FIG. 1 in accordance with an exemplary embodiment of this invention.

FIG. 2 depicts a block diagram of the salient components of an exemplary node 101-$i$, node 101-3. Node 101-3 receives:
 1. an OC-768 SONET/SDH signal from node 101-2, on OC-768 line 112-2-3;
 2. an OC-768 SONET/SDH signal from node 101-4 on OC-768 line 111-4-3; and transmits:
 1. an OC-768 SONET/SDH signal to node 101-2, on line 111-3-2; and
 2. an OC-768 SONET/SDH signal to node 101-4 on line 112-3-4.

Node 101-3 includes a switch core 202-3 comprising: add/drop multiplexor/switch/time slot interchanger (hereinafter "north switching network") 201-3-N and add/drop multiplexor/switch/time slot interchanger (hereinafter "south switching network") 201-3-N, interconnected as shown.

A salient characteristic of the illustrative embodiment is that line 1114-3 from the "west" 206 (i.e., the OC-768 from node 101-4) is fed into one of the line inputs of north switching network 201-3-N and line 111-3-2 (i.e., the OC-768 to node 101-2) emanates from the "east" 208 from one of the line outputs of north switching network 201-3-N. Analogously, line 112-2-3 (i.e., the OC-768 from node 101-2) from the east 208 is fed into one of the line inputs of south switching network 201-3-S and line 112-3-4 (i.e., the OC-768 to node 101-4) emanates from the west 206 from one of the line outputs of south switching network 201-3-S. In other words, line 111 traverses only north switching network 201-3-N and line 112 traverses only south switching network 201-3-S. This is in noted contrast to composite add/drop multiplexors in the prior art in which both lines traverse both constituent add/drop multiplexors.

In node 101-3, line 203-3 is an OC-768 from north switching network 201-3-N to south switching network 201-3-S and line 204-3 is an OC-768 from south switching network 201-3-S to north switching network 201-3-N.

North switching network 201-3-N receives eight OC-192 tributaries, 221-3-1 through 221-3-8, and spawns eight OC-192 tributaries, 222-3-1 through 222-3-8. South switching network 201-3-S receives eight OC-192 tributaries, 221-3-9 through 221-3-16, and spawns eight OC-192 tributaries, 222-3-9 through 222-3-16.

The illustrative embodiment is advantageous over the prior art in two principal respects. First, if either constituent add/drop multiplexor in the prior art node fails, the traffic on both rings is affected. In contrast, if either constituent add/drop multiplexor in the illustrative embodiment fails, only the traffic on one ring is affected. From a fault-tolerance perspective, this is highly advantageous.

Second, because the through traffic on each ring does not go through both north switching network 201-3-N and south switching network 201-3-S, lines 203-3 and 204-3 need not carry through traffic, and, therefore, their bandwidth can be used for better purposes.

For example, the bandwidth on lines 203-3 and 204-3 can be used is to ameliorate the well-known "add-before-drop" problem. In a non-composite or holistic add/drop multiplexor, the bandwidth recovered from dropping a tributary is immediately available for consumption by a received tributary and there is no add-before-drop problem. In contrast, in a composite add/drop multiplexor, the addition and dropping of tributaries must be carefully coordinated because it might not be possible to add a tributary before another is dropped.

A second purpose for which the spare bandwidth on lines 203-3 and 204-3 can be used is to facilitate hairpinning between north switching network 201-3-N and south switching network 201-3-S. In other words, a tributary can be received at north switching network 201-3-N, switched to south switching network 201-3-S via line 203-3, and dropped via south switching network 201-3-S. Analogously, a tributary can be received at south switching network 201-3-S, switched to north switching network 201-3-N via line 204-3, and dropped via north switching network 201-3-N.

A third purpose for which the bandwidth on lines 203-3 and 204-3 can be used is to facilitate inter-ring traffic. For example, an STS-1 on ring 111 that needs to be switched to ring 112 by node 101-3 needs to be carried by line 203-3. Analogously, an STS-1 on ring 112 that needs to be switched to ring 11 by node 101-3 needs to be carried by line 204-3.

Figure 3:
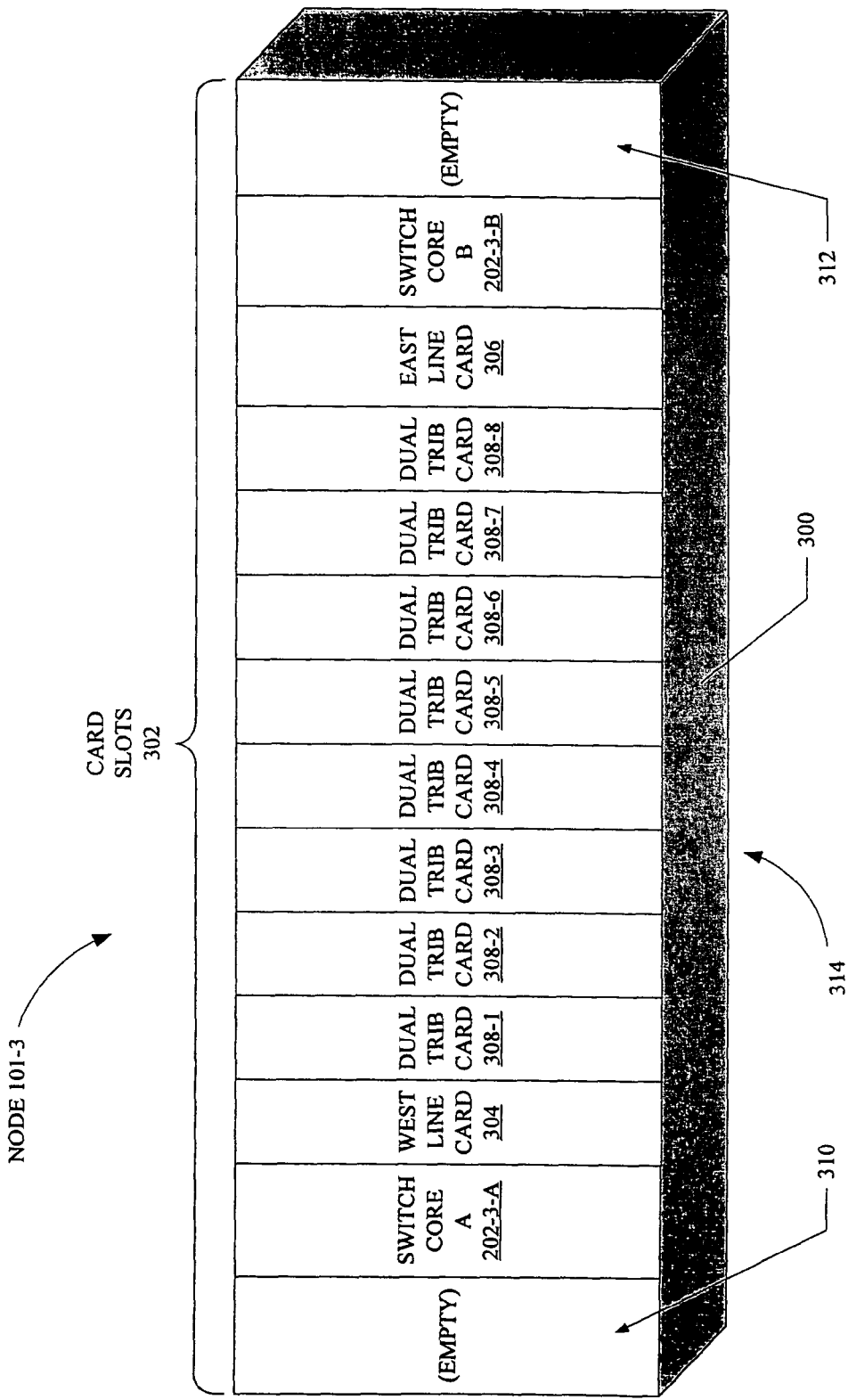
FIG. 3 depicts a perspective of an exemplary physical embodiment of the switching node of FIGS. 1 and 2 illustrating the component cards in a cabinet in a first configuration.

FIG. 3 depicts a physical shelf 300 and card layout of a switching node 101-i, herein 101-3 of FIG. 1, in a first, low-capacity configuration. The exemplary switching node, switching node 101-3 comprises a single-shelf 300, redundant switching system according to the exemplary embodiment of this invention. A plurality of card slots 302 is available on shelf 300, as is known in the art. According to the exemplary embodiment of this invention, there are 14 card slots 302 available. The shelf is populated, in its low-capacity configuration, with redundant switch cores, switch cores 202-3-A and 202-3-B. Both switch core 202-3-A and 202-3-B correspond to switch core 202-3 described above in FIG. 2. Switch core 202-3-A and 202-3-B comprise a "warm spare" arrangement, as is known in the art, and thus not discussed further.

A west line card 304 receives signals on line 111-4-3 from node 1014 and sends signals on line 112-3-4 to node 101-4. An east line card 306 receives signals on line 112-2-3 from node 101-2 and sends signals on line 111-3-2 to node 101-2. A plurality of dual trib cards 308 each receive two trib signals 121-3 and send two trib signals 122-3. Thus, dual trib card 308-1 receives signals on tribs 121-3-1 and 121-3-9 and sends signals on tribs 122-3-1 and 122-3-9. Dual trib card 308-2 receives signals on tribs 121-3-2 and 121-3-10 and sends signals on tribs 122-3-2 and 122-3-10. Dual trib card 308-3 receives signals on tribs 121-3-3 and 121-3-11 and sends signals on tribs 122-3-3 and 121-3-11. Dual trib card 3084 receives signals on tribs 121-34 and 121-3-12 and sends signals on tribs 122-34 and 121-3-12. Dual trib card 308-5 receives signals on tribs 121-3-5 and 121-3-113 and sends signals on tribs 122-3-5 and 121-3-13. Dual trib card 308-6 receives signals on tribs 121-3-6 and 121-3-14 and sends signals on tribs 122-3-6 and 121-3-14. Dual trib card 308-7 receives signals on tribs 121-3-7 and 121-3-15 and sends signals on tribs 122-3-7 and 121-3-15. Finally, dual trib card 308-8 receives signals on tribs 121-3-8 and 121-3-16 and sends signals on tribs 122-3-8 and 121-3-16.

Shelf 300 is further depicted with empty slot 310 and empty slot 312. Empty slot 310 and empty slot 312 comprise slots for further switch cores 202, according to a second configuration, which can effectively increase the capacity of node 101 up to double the depicted capacity. All card slots 302 (including slot 310 and slot 312) are connected via backplane 314, which will be described in more detail, below.

Figure 4:
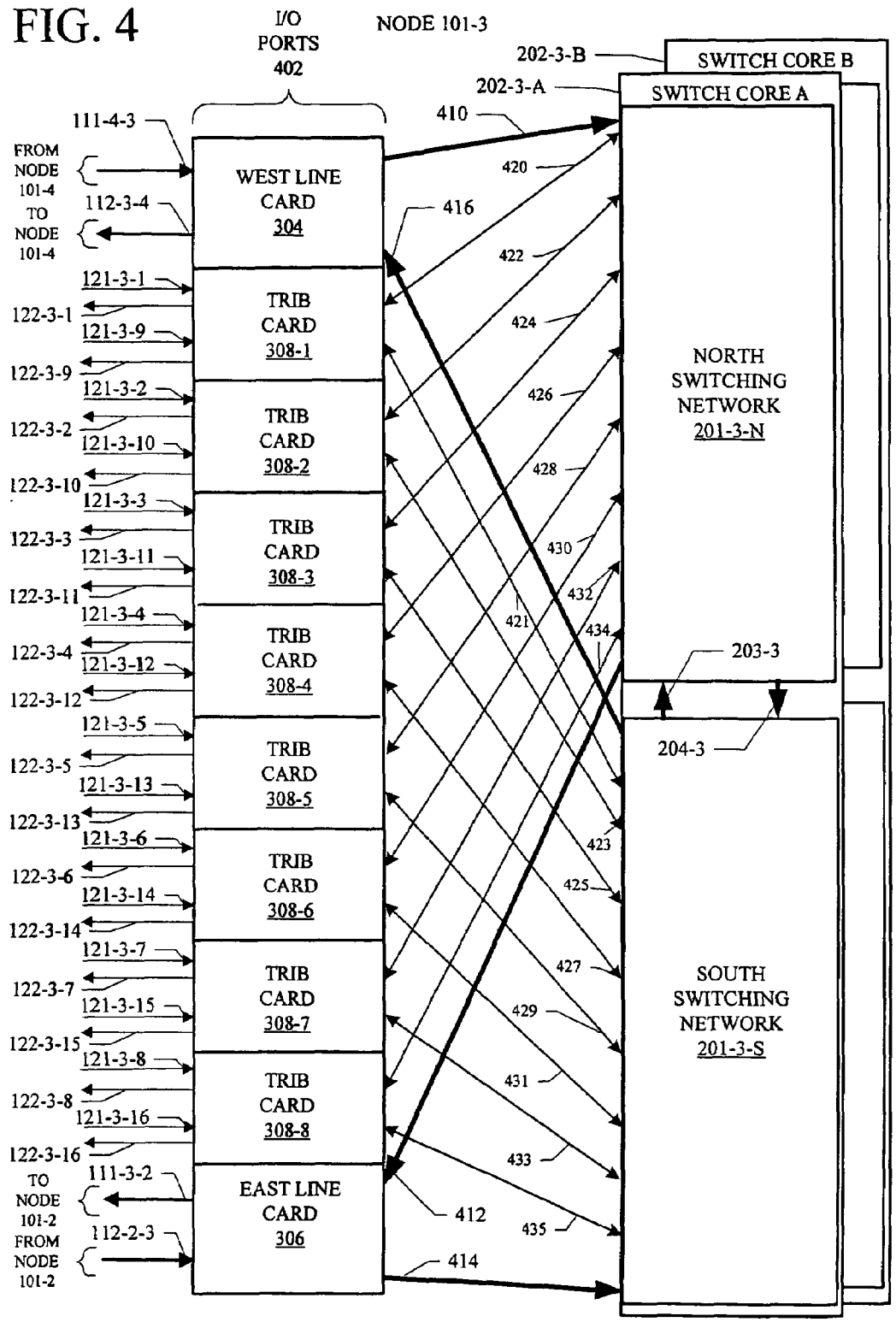
FIG. 4 depicts a logical block diagram of the switching node of FIGS. 1, 2 and 3 illustrating the logical interconnections of the switching node's components.

FIG. 4 depicts a logical block diagram of the physical components of an exemplary node 101-i, herein node 101-3 (as above), and the logical interconnections of the physical components according to an exemplary embodiment of this invention. In this exemplary embodiment of the physical layout of node 101-3, node 101-3 includes the above-described switching core 203-3-A, which comprises north switching network 201-3-N and south switching network 201-3-S interconnected by line 203-3 and 204-3, as illustrated. In accordance with common switching node practice, node 101-3 includes a second switching core, switching core 202-3-B. As mentioned above, switching core 202-3-B acts as a "warm spare"; that is, it processes a copy of all signals that switching core 202-3-A processes. When needed, a decision is made as to which switching core 202-3-A or 202-3-B has more accurate signals, and that copy is used. Other configurations as known in the art may be substituted for this 1+1 sparing arrangement without departing from the scope of the appended claims.

Optical signals from lines 111 and 112 and tribs 121 and 122 are received/transmitted at a plurality of I/O ports 402. I/O ports 402 include west line card 304 that interfaces signals to/from the "west" side 206 of node 101-3. West line card 304 receives an OC-768 signal from node 101-4 on line 111-4-2, in this exemplary embodiment, and transmits an OC-768 signal to node 101-4 on line 112-3-4. West line card 304 performs optical/electrical conversion, retiming, signal replication and other well-known functions, as will be described in more detail below, in connection with FIG. 5.

I/O ports 402 also comprise east line card 306 that interfaces signals to/from the "east" side 208 of node 101-3. East line card 206 receives an OC-768 signal from mode 101-2 on line 111-2-3, in this exemplary embodiment, and transmits an OC-768 signal to node 101-2 on line 112-3-2. East line card 306 performs optical/electrical conversion, retiming, signal replication and other well-known functions, as will be described in more detail below, in connection with FIG. 6.

Further, I/O ports 402 comprise a plurality of trib cards 308. There are 8 trib cards, 308-1 through 308-8, in this exemplary embodiment. Each trib card 308-1 through 308-8 receives/sends two OC-192 trib signals. Other arrangements of trib cards 308 may be implemented by those skilled in the art after reading this specification. An exemplary trib card 308 will be described further, below, in connection with FIG. 7.

I/O ports 402 are connected to both switch core 202-3-A and 202-3-B via a backplane 312, which will be described in more detail in connection with FIGS. 5, 11 and 12, below. Logically, and in accordance with the description of FIG. 2, above, west line card 304 receives an OC-768 signal from node 101-4 on line 111-4-3 and transforms the optical signals into electrical signals, conditions the signals for use in node 101-3 and send them to north switching network 201-3-N along unidirectional 40 Gb/s line 410, according to this embodiment of this invention. North switching network 201-3-N performs add/drop multiplexing, switching and timeslot interchanging, as described above. North switching network 201-3-N sends an output signal to east line card 306 on unidirectional 40 Gb/s line 412. East line card 306 transforms the electrical signals into optical signals and sends them to node 101-2 on line 111-3-2.

In the opposite direction (i.e., east-to-west), east line card 306 receives an OC-768 signal from node 101-2 on line 111-2-3 and transforms the optical signals into electrical signals, conditions the signals for use in node 101-3 and sends the electrical signals to south switching network 201-3-S on unidirectional 40 Gb/s line 414. South switching network 201-3-S performs add/drop multiplexing, switching and timeslot interchanging, as described above. South switching network 201-3-S sends an output signal to west line card 304 on unidirectional 40 Gb/s line 416. West line card 304 transforms the electrical signals into optical signals and sends them to node 101-4 on line 112-3-4.

According to this exemplary embodiment, trib cards 308 receive up to 16 OC-192 inputs, as illustrated. Each trib card performs optical to electrical conversion and sends the signals to north switching network 201-3-N and south switching network 201-3-S via 10 Gb/s links. For purposes of clarity of this drawing of node 101-3, the links are bidirectional; therefore, each trib card also receives a 10 Gb/s signal from both the north switching network 201-3-N and south switching network 201-3-S. For purposes of describing this invention, trib card 308-1 receives optical signals on tribs 121-3-1 and 121-3-9 and sends electrical signals on link 420 to north switching network 201-3-N and on link 421 to south switching network 201-3-S, respectively. Trib card 308-1 receives electrical signals from north switching network 201-3-N on link 420 and from south switching network 201-3-S on link 421 and transmits optical signals on tribs 122-3-1 and 122-3-9, respectively. Trib card 308-2 receives optical signals on tribs 121-3-2 and 121-3-10 and sends electrical signals on link 422 to north switching network 201-3-N and on link 423 to south switching network 201-3-S, respectively. Trib card 308-2 receives electrical signals from north switching network 201-3-N on link 422 and from south switching network 201-3-S on link 423 and transmits optical signals on tribs 122-3-2 and 122-3-10, respectively. Trib card 308-3 receives optical signals on tribs 121-3-3 and 121-3-11 and sends electrical signals on link 424 to north switching network 201-3-N and on link 425 to south switching network 201-3-S, respectively. Trib card 308-3 receives electrical signals from north switching network 201-3-N on link 424 and from south switching network 201-3-S on link 425 and transmits optical signals on tribs 122-3-3 and 122-3-11, respectively. Trib card 308-4 receives optical signals on tribs 121-34 and 121-3-12 and sends electrical signals on link 426 to north switching network 201-3-N and on link 427 to south switching network 201-3-S, respectively. Trib card 308-4 receives electrical signals from north switching network 201-3-N on link 426 and from south switching network 201-3-S on link 427 and transmits optical signals on tribs 122-3-4 and 122-3-12, respectively.

Trib card 308-5 receives optical signals on tribs 121-3-5 and 121-3-13 and sends electrical signals on link 428 to north switching network 201-3-N and on link 429 to south switching network 201-3-S, respectively. Trib card 308-5 receives electrical signals from north switching network 201-3-N on link 428 and from south switching network 201-3-S on link 429 and transmits optical signals on tribs 122-3-5 and 122-3-13, respectively. Trib card 308-6 receives optical signals on tribs 121-3-6 and 121-3-14 and sends electrical signals on link 430 to north switching network 201-3-N and on link 431 to south switching network 201-3-S, respectively. Trib card 308-2 receives electrical signals from north switching network 201-3-N on link 430 and from south switching network 201-3-S on link 431 and transmits optical signals on tribs 122-3-6 and 122-3-14, respectively. Trib card 308-7 receives optical signals on tribs 121-3-7 and 121-3-15 and sends electrical signals on link 432 to north switching network 201-3-N and on link 433 to south switching network 201-3-S, respectively. Trib card 308-7 receives electrical signals from north switching network 201-3-N on link 432 and from south switching network 201-3-S on link 433 and transmits optical signals on tribs 122-3-7 and 122-3-15, respectively. Finally, trib card 308-8 receives optical signals on tribs 121-3-8 and 121-3-16 and sends electrical signals on link 434 to north switching network 201-3-N and on link 435 to south switching network 201-3-S, respectively. Trib card 308-8 receives electrical signals from north switching network 201-3-N on link 434 and from south switching network 201-3-S on link 435 and transmits optical signals on tribs 122-3-8 and 122-3-16, respectively.

Figure 5:
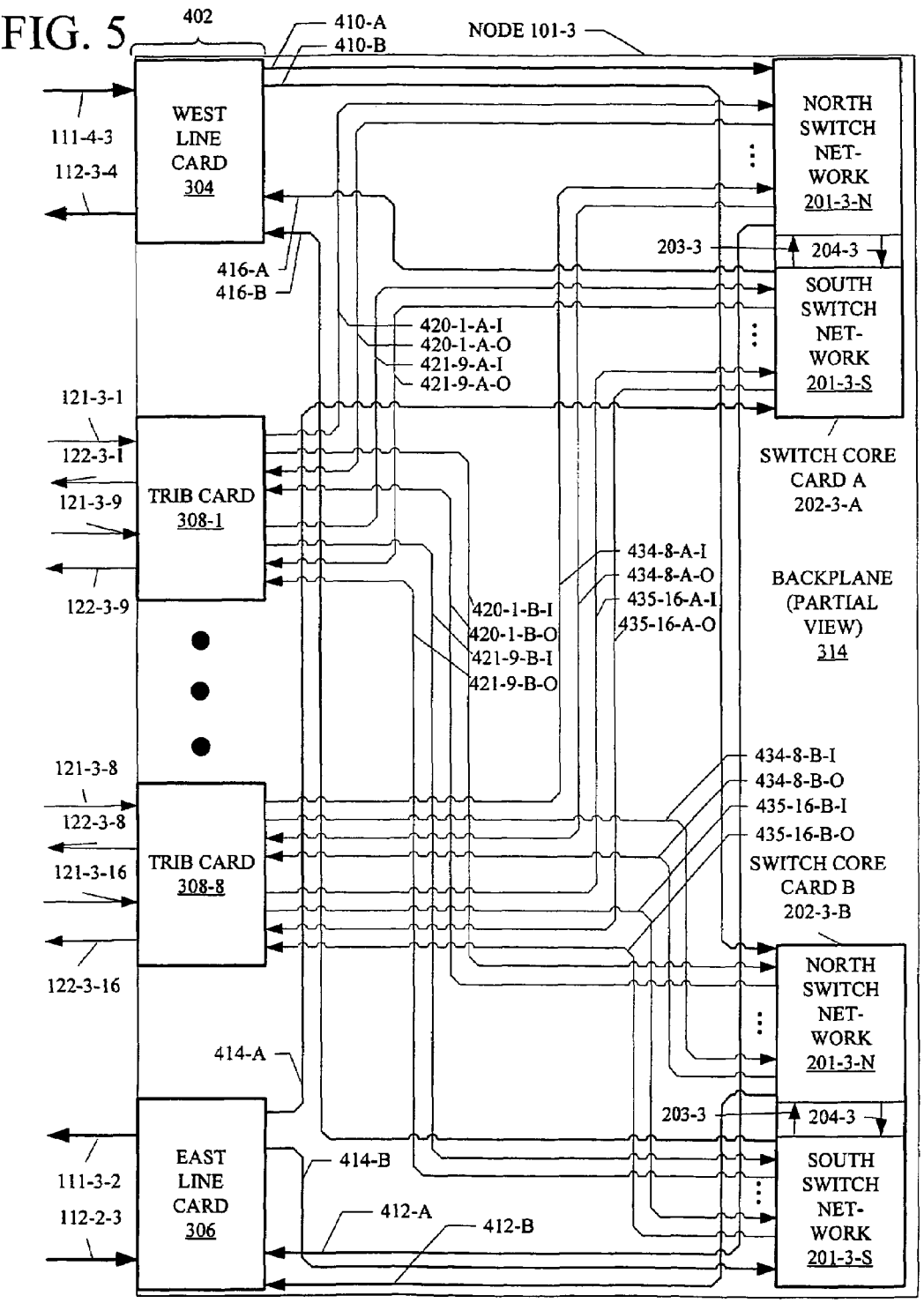
FIG. 5 depicts a partial block diagram of a switching node of FIGS. 1, 2, 3 and 4 illustrating physical backplane interconnections in accordance with an illustrative embodiment of this invention.

FIG. 5 depicts a block diagram of physical connections between I/O ports 402 and switch cores 202-3-A and 202-3-B across an exemplary backplane 314 (shown in partial view) of node 101-3 according to an aspect of this invention. Line cards 304 and 306 and trib cards 308-1 through 308-8 are connected to a backplane 314. Backplane 314 comprises a plurality of uni-directional traces that carry electrical signals between the I/O ports 402 and switching cores 202-3-A and 202-3-B of node 101-3. In this exemplary embodiment of physical connections, west line card receives an OC-768 from node 1014 on line 1114-3 and transmits an OC-768 signal to node 101-2 on line 112-34. West line card performs optical/electrical conversion, retiming and signal replication to effect redundancy.

West line card 304 sends identical copies of the received OC-768 signal into backplane 314 to switch core 202-3-A on line trace 301-A and to switch core 202-3-B on line trace 301-B. These signals are processed by switch core 202-3-A and switch core 202-3-B and delivered to east line card 306 on line traces 312-A and 312-B, respectively. East line card 306 selects one of the signals, performs electrical/optical conversion and sends the resulting optical signal on line 111-3-2 to node 101-2.

East line card 306 receives an OC-768 signal on line 112-2-3 from node 101-2. East line card 306 performs optical/electrical conversion, retiming and signal replication and then transmits identical signals on line trace 314-A to switch core 202-3-A and on line trace 314-B to switch core 202-3-B. These signals are processed by switch core 202-3-A and switch core 202-3-B and delivered to west line card 304 on line traces 316-A and 316-B, respectively. West line card 304 selects one of the signals, performs electrical/optical conversion and sends the resulting optical signal on line 112-3-4 to node 101-4.

A plurality of trib cards 308-1 through 308-8 are connected to backplane 314. Only trib card 308-1 and trib card 308-8 are illustrated here for clarity. Each trib card 308-1 through 308-2 receives an OC-192 signal on trib 121-3-1 through 121-3-8 and a second OC-192 signal on trib 121-3-9 through 121-3-16, respectively.

In the exemplary embodiment of FIG. 5, trib card 308-1 receives an OC-192 signal on trib 121-3-1 performs optical/electrical conversion, retiming and signal replication and then transmits identical signals on trib trace 320-1-I (wherein "1" stands for "trib 1" and "I" stands for "input") to switch core 202-3-A and on trib trace 321-1-I to switch core 202-3-B. Switch core 202-3-A and switch core 202-3-B perform their switching functions on the input signals and send output signals to trib card 308-1 on trib trace 320-1-O (wherein "O" stands for "output") and trib trace 321-1-O, respectively. Trib card 308-1 selects one of the signals, performs electrical/optical conversion and sends the resulting signal on trib 122-3-1.

Furthermore, trib card 308-1 receives an OC-192 signal on trib 121-3-9 performs optical/electrical conversion, retiming and signal replication and then transmits identical signals on trib trace 320-9-I (wherein "9" stands for "trib 9" and "I" stands for "input") to switch core 202-3-A and on trib trace 321-9-I to switch core 202-3-B. Switch core 202-3-A and switch core 202-3-B perform their switching functions on the input signals and send output signals to trib card 308-1 on trib trace 320-9-O (wherein "O" stands for "output") and trib trace 321-9-O, respectively. Trib card 308-1 selects one of the signals, performs electrical/optical conversion and sends the resulting signal on trib 122-3-9.

In the exemplary embodiment of FIG. 5, only two exemplary trib cards 308 are illustrated. One skilled in the art will appreciate that more trib cards 308 would be connected through backplane traces 320-335 and be able to realize the backplane after studying this disclosure. According to this exemplary embodiment, trib card 308-8 receives an OC-192 signal on trib 121-3-8 performs optical/electrical conversion, retiming and signal replication and then transmits identical signals on trib trace 334-8-I (wherein "8" stands for "trib 8" and "I" stands for "input") to switch core 202-3-A and on trib trace 335-8-I to switch core 202-3-B. Switch core 202-3-A and switch core 202-3-B perform their switching functions on the input signals and send output signals to trib card 308-1 on trib trace 334-8-O (wherein "O" stands for "output") and trib trace 335-8-O, respectively. Trib card 308-8 selects one of the signals, performs electrical/optical conversion and sends the resulting signal on trib 122-3-8.

Furthermore, trib card 308-8 receives an OC-192 signal on trib 121-3-16 performs optical/electrical conversion, retiming and signal replication and then transmits identical signals on trib trace 334-16-I (wherein "16" stands for "trib 16" and "I" stands for "input") to switch core 202-3-A and on trib trace 335-16-I to switch core 202-3-B. Switch core 202-3-A and switch core 202-3-B perform their switching functions on the input signals and send output signals to trib card 308-8 on trib trace 334-16-O (wherein "O" stands for "output") and trib trace 335-16-O, respectively. Trib card 308-8 selects one of the signals, performs electrical/optical conversion and sends the resulting signal on trib 122-3-16. Further detail of backplane 314 will be described further, below, in connection with FIGS. 10-12.

Figure 6:
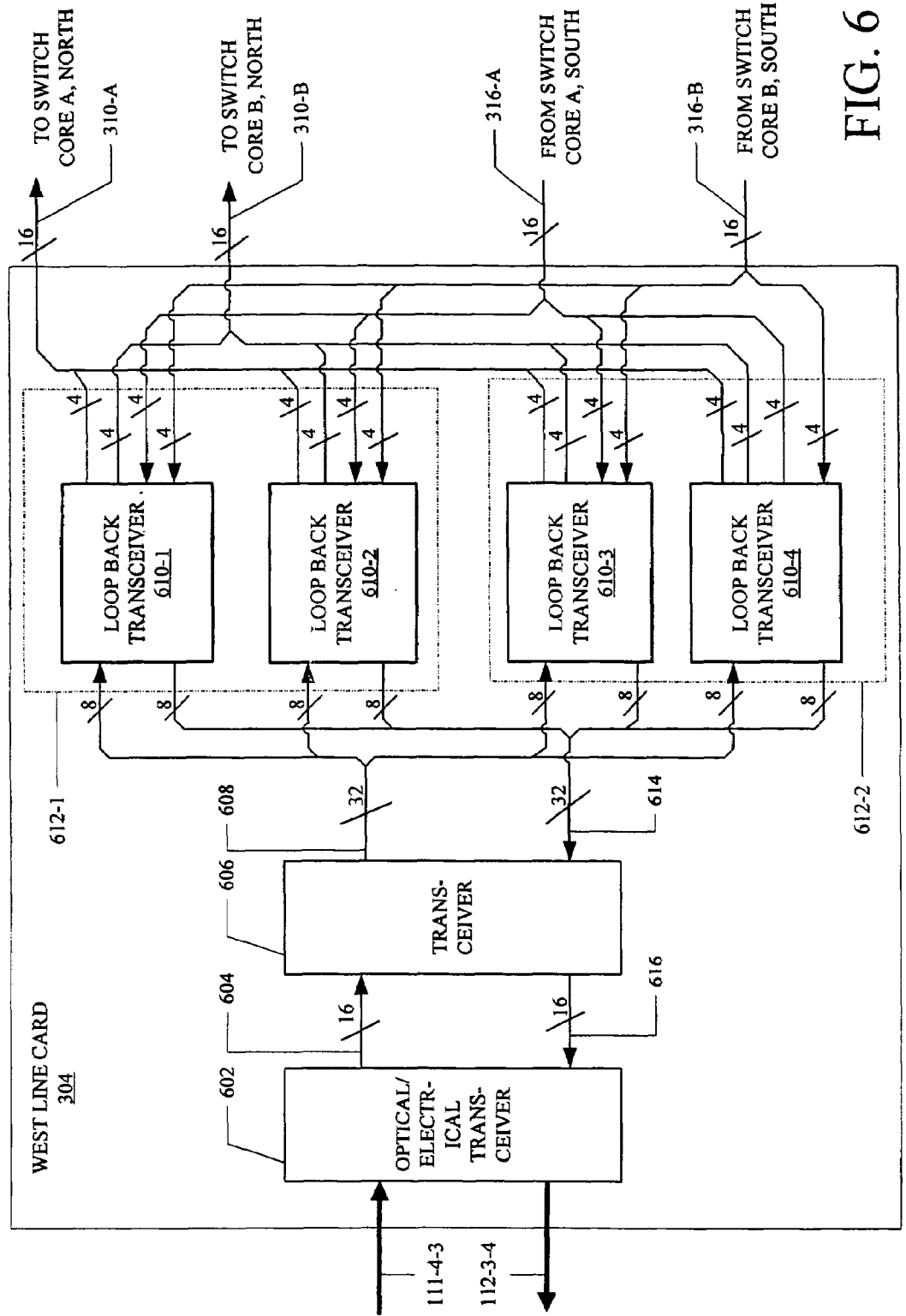
FIG. 6 depicts a block diagram of the west line card of the switching node of FIGS. 3, 4 and 5.

Turning to FIG. 6, west line card 304 is illustrated in more detail. According to this exemplary embodiment, west line card receives an OC-768 signal from optical line 111-4-3 at optical/electrical transceiver 502. Optical/electrical transceiver 502 performs optical to electrical conversion as is known in the art and transmits the resultant electrical signals over 16 bit bus 504 at 2.5 Gb/s to transceiver 506. Transceiver 506 performs deserialization and timing functions as is known in the art and transmits the resultant electrical signals over 32 bit bus 508 at 1.25 Gb/s. Eight bits of bus 508 are delivered to each of four loop-back transceivers 510-1 through 4. In this exemplary embodiment of this invention, loop-back transceivers 510-1 and 510-2 comprise one integrated circuit 512-1 and loop back transceivers 510-3 and 510-4 comprise a second integrated circuit 512-2. Loop back transceivers 510-1 through 4 each receive 8 bit from transceiver 506 and transmits 4 bits (16 bits total) at 2.5 Gb/s across backplane 314 to switch core A, north on trace 310-A and to switch core B, north on trace 310-B.

In the opposite direction, west line card receives 16 bits at 2.5 Gb/s from switch core A, south on trace 316-A and 16 bits at 2.5 Gb/s from switch core B, south on trace 316-B. Four bits from each trace 316-A and 316-B are delivered to each loop back transceiver 510-1 through 4. Loop back transceivers 510-1 through 4 perform signal selection, timing and deserialization and deliver 8 bits each in parallel to 32 bit bus 514 at 1.25 Gb/s. Transceiver 506 receives signals from bus 514, performs serialization and delivers 16 bits at 2.5 Gb/s on line 516 to optical/electrical transceiver 502. Optical/electrical transceiver 502 performs electrical to optical conversion, and transmits optical signals on OC-768 line 112-3-4.

Figure 7:
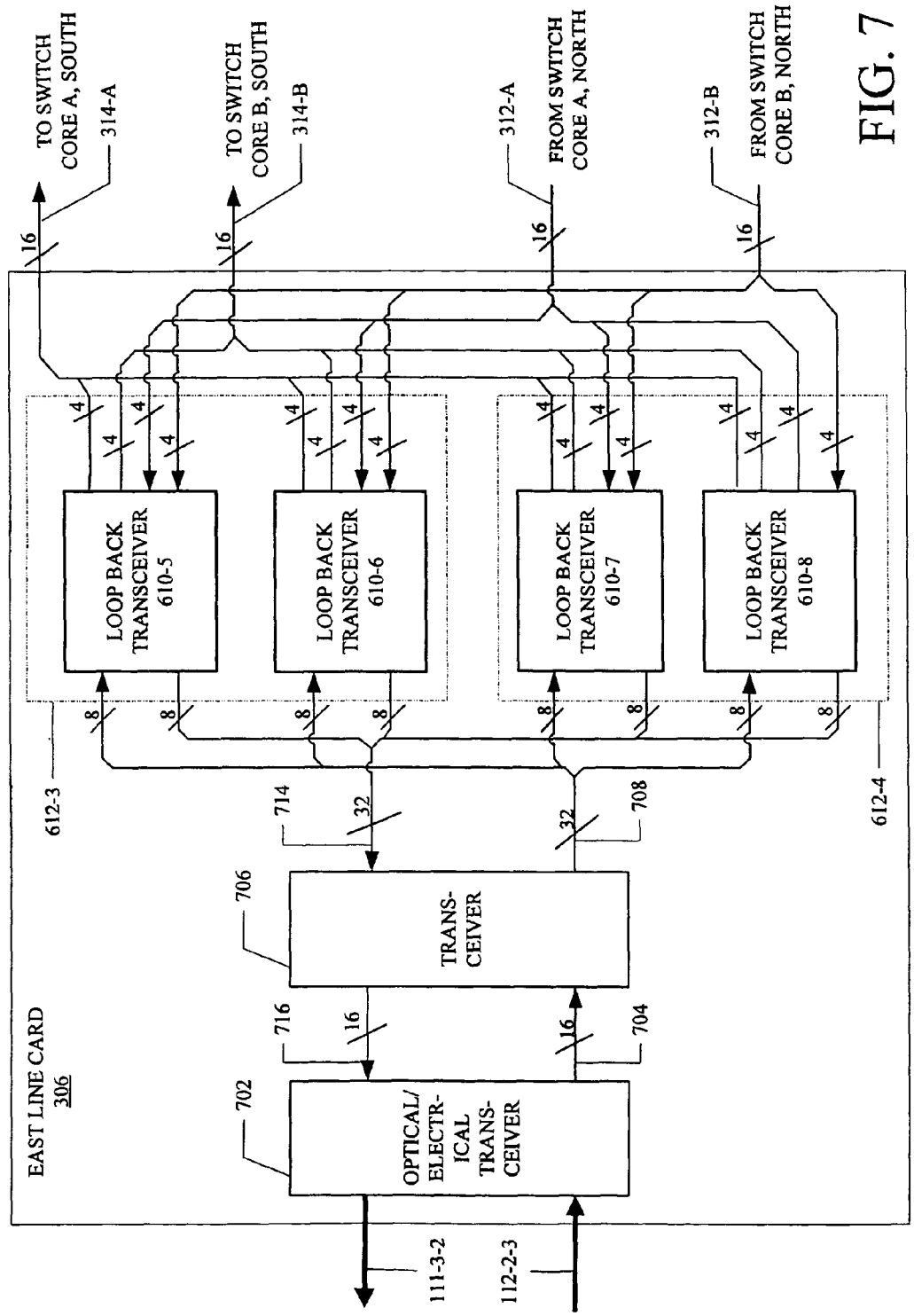
FIG. 7 depicts a block diagram of the east line card of the switching node of FIGS. 3, 4 and 5.

Turning to FIG. 7, east line card 306 is illustrated in more detail. According to this exemplary embodiment, east line card 306 receives an OC-768 signal from optical line 112-2-3 at optical/electrical transceiver 602. Optical/electrical transceiver 602 performs optical to electrical conversion as is known in the art and transmits the resultant electrical signals over 16 bit bus 604 at 2.5 Gb/s to transceiver 606. Transceiver 606 performs deserialization and timing functions as is known in the art and transmits the resultant electrical signals over 32 bit bus 608 at 1.25 Gb/s. Eight bits of bus 608 are delivered to each of four loop-back transceivers 510-5 through 8 (all loop-back transceivers 510 are identical according to this exemplary embodiment of this invention). In this exemplary embodiment of this invention, loop-back transceivers 510-6 and 510-7 comprise one integrated circuit 512-3, and loop back transceivers 510-7 and 510-8 comprise a second integrated circuit 512-4. Loop back transceivers 510-5 through 8 each receive 8 bit from transceiver 606 and transmits 4 bits at 2.5 Gb/s across backplane 314 to switch core A, south on trace 314-A and to switch core B, south on trace 314-B.

In the opposite direction, east line card 306 receives 16 bits at 2.5 Gb/s from switch core A, north on trace 312-A and 16 bits at 2.5 Gb/s from switch core B, north on trace 312-B. Four bits from each line trace are delivered to each loop back transceiver 510-5 through 8. Loop back transceivers 510-5 through 8 perform signal selection, timing and deserialization functions and deliver 8 bits each in parallel to 32 bit bus 614 at 1.25 Gb/s. Transceiver 606 receives signals on bus 614 and performs serialization and delivers 16 bits at 2.5 Gb/s on bus 616 to optical/electrical transceiver 602. Optical/electrical transceiver 602 performs electrical to optical conversion, and transmits optical signals on OC-768 line 111-3-2.

Figure 8:
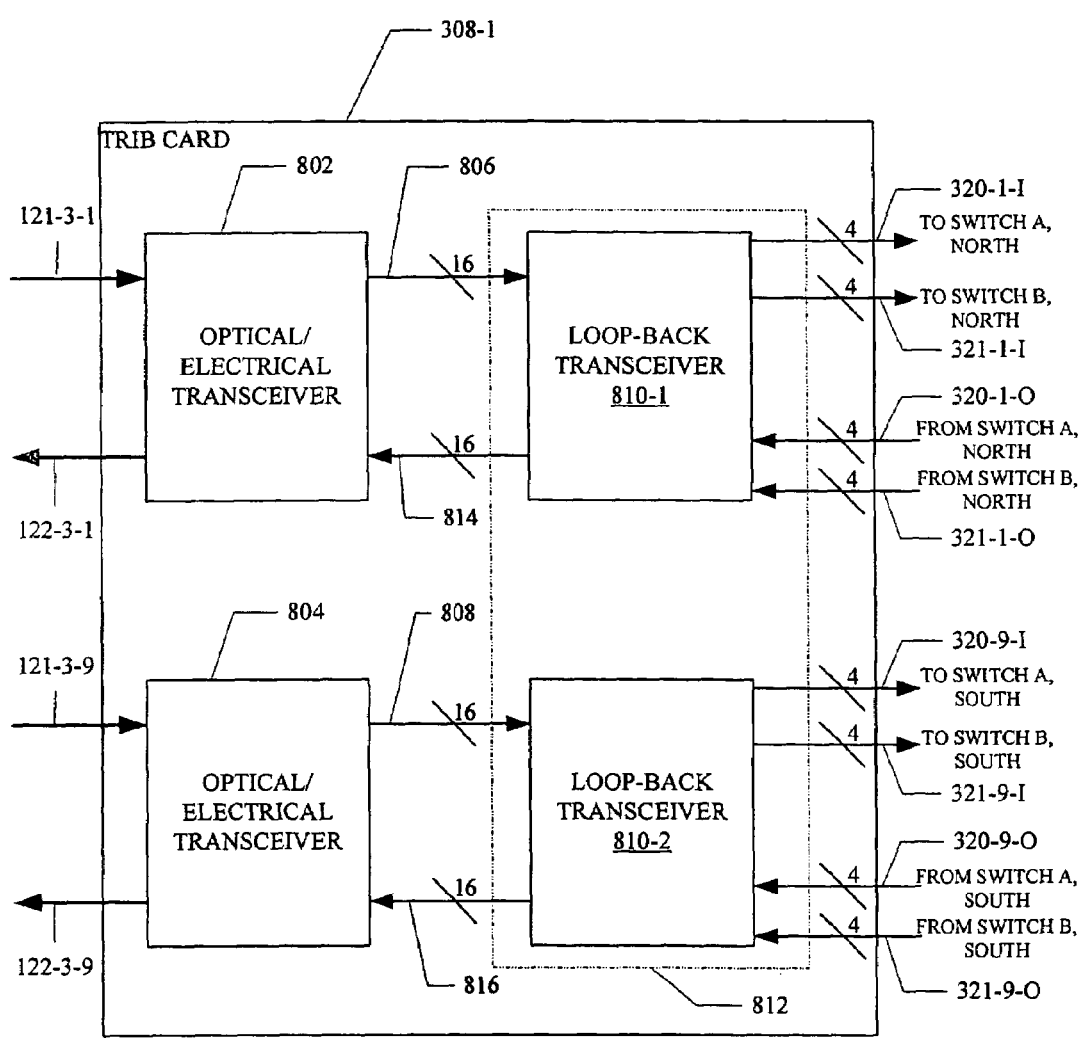
FIG. 8 depicts a block diagram of a trib card of the switching node of FIGS. 3, 4 and 5.

Turning to FIG. 8, an exemplary trib card 308-1 is shown in a more detailed block diagram. Trib card 308-1 receives two OC-192 optical signals 121-3-1 and 121-3-9 from tributary sources, which are known in the art. Tributary signal 121-3-1 is received at optical/electrical transceiver 702 and tributary signal 121-3-9 is received at optical/ electrical transceiver 704. Optical/electrical transceivers 702 and 704 convert the OC-192 signals to electrical signals, as known in the art. Optical/electrical transceiver 702 delivers electrical signals over 16 bit bus 706 at 622 Mb/s to loop-back transceiver 710-1 and optical/electrical transceiver 704 delivers electrical signals over 16 bit bus 708 at 622 Mb/s to loop-back transceiver 710-2. Loop back transceivers 710-1 and 710-2 perform replication, retiming and serialization functions, as are known in the art. In this exemplary embodiment, loop-back transceiver 710-1 and loop-back transceiver 710-2 comprise a single integrated circuit 712.

Loop back transceiver 710-1 delivers 4 bits at 2.5 Gb/s over backplane 314 to switch A, north on trace 320-1-I and 4 bits at 2.5 Gb/s over backplane 314 to switch B, north on trace 321-1-I. Loop back transceiver 710-2 delivers 4 bits at 2.5 Gb/s over backplane 314 to switch A, south on trace 320-9-I and 4 bits at 2.5 Gb/s over backplane 314 to switch B, south on trace 320-9-I.

In the opposite direction, trib card 308-1 receives 4 bits from switch A, north on trace 320-1-O and switch B, north on trace 321-1-O at loop back transceiver 710-1. Trib card 308-1 also receives 4 bits from switch A, south on trace 321-9-O and 4 bit from switch B, south on trace 321-9-O at loop back transceiver 710-2. Loop back transceivers 710-1 and 710-2 each select one of the signals and deserialize them. Loop-back transceivers 710-1 and 710-2 deliver their signals to 16 bit buses 714 and 716, respectively, which are delivered to optical/electrical transceivers 702 and 704. Optical/electrical transceivers 702 and 704 convert the electrical signals to OC-192 optical signals. The optical signals are sent out on trib 122-3-1 and 122-3-9, respectively.

Figure 9:
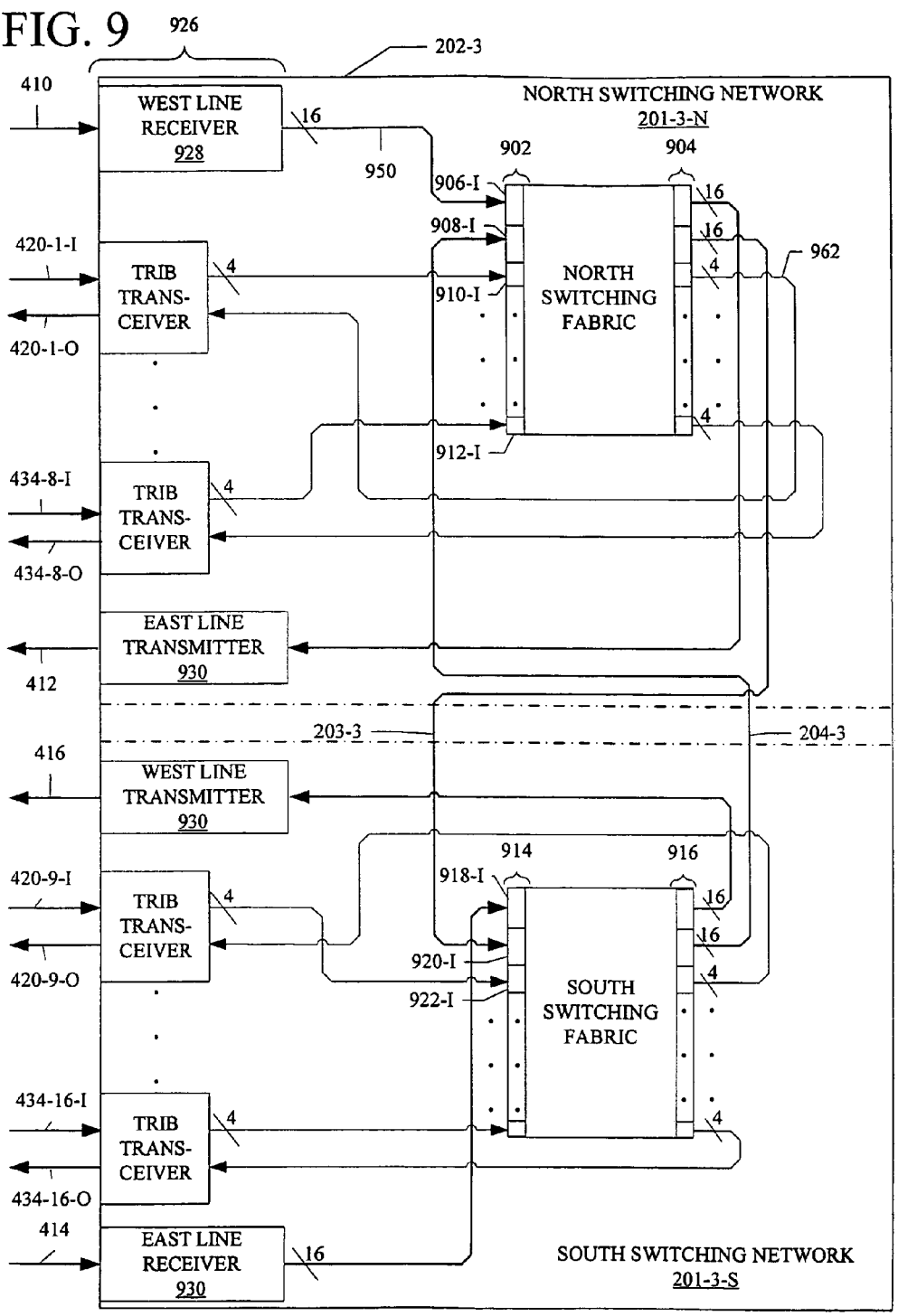
FIG. 9 depicts a block diagram of the switching core card of FIGS. 3, 4 and 5 in accordance with an illustrative embodiment of this invention.

Turning now to FIG. 9, an exemplary switching core 202, switching core 202-3-A, is illustrated in more detail. According to this exemplary embodiment of this invention, switching core 202-3-A comprises two switching networks, north switching network 201-3-N and south switching network 201-3-S. Advantageously, north switching network 201-3-N and south switching network 201-3-S may be the same or similar to the switching network described in U.S. patent application Ser. No. 09/974,448, filed Oct. 10, 2001, which is assigned to the assignee of this invention and is incorporated herein by reference in its entirety. As stated above in connection with FIG. 2, north switching network 201-3-N and south switching network 201-3-S perform add/drop multiplexor/switch/timeslot interchange functionality on signals from lines 111 and 112 and tribs 121-1 through 121-16 simultaneously. In this manner, all STS-1's on any line and trib can be switched from line to trib, trib to line, trib to trib, etc. Each line and trib switched by a switching network 201 is defined herein to be a "lane" of signals. In this exemplary embodiment of this invention, each switching network 201 switches 10 lanes of signals, that is, signals from two lines and signals from eight tribs.

Thus, according to an exemplary embodiment of this invention, each lane in north switching network 201-3-N has an input side 802 and an output side 804. A first line lane in north switching network 201-3-N comprises line lane input 806-I and line lane output 806-O. A second line lane comprises line lane input 808-I and line lane output 808-O. The plurality of lanes further comprises eight trib lanes represented by two trib lanes, comprising trib lane input 810-I and trib lane output 810-O and trib lane input 812-I and trib lane output 812-O.

Likewise, south switching network 201-3-S has an input side 814 and an output side 816. A first line lane comprises line lane input 818-I and line lane output 818-O. A second line lane comprises line lane input 818-I and line lane output 818-O. The plurality of lanes further comprises eight trib lanes. The trib lanes are represented by two trib lanes, comprising trib lane input 822-I and trib lane output 822-O and trib lane input 824-I and trib lane output 824-O.

Switching core 202-3-A also comprises a plurality of transceivers 826, in this exemplary embodiment. Transceivers 826 comprise west line transceiver 828, east line transceiver 830 and eight trib transceivers, 832-1 through 832-8. West line transceiver 828 receives 16 bit trace 310-A from west line card 304. West line transceiver 804 performs retiming and other functions, as is known in the art and delivers signals on 16 bit line 850 to line lane input 806-I of north switching network 201-3-N. After switching is performed according to the above-incorporated switching network, line lane output 806-O delivers 16 bits on line 852 to east line transceiver 830. East line transceiver 830 performs retiming and other functions known in the art and transmits signals on trace 312-A to east line card 306.

Likewise, east line transceiver 830 receives signals on 16 bit trace 314-A from east line card 306. East line transceiver 830 performs retiming and other functions, as is known in the art and delivers 16 bits via line 854 to line lane input 818-I of south switching network 201-3-S. After switching is performed according to the above-incorporated switching network, line lane output 818-O delivers 16 bits on line 856 to west line transceiver 828. West line transceiver 828 performs retiming and other functions known in the art and transmits signals on trace 316-A to west line card 304.

North switching network 201-3-N receives signals on 16 bit line 204-3 at lane 808-I from south switching network 201-3-S. North switching network 201-3-N performs add/drop multiplexor/switch/timeslot interchanger functions on the signals, which are delivered by line output lane 808-O via 16 bit line 203-3 to line input lane 820-I of south switching network 201-3-S. South switching network 201-3-S receives signals on 16 bit line 203-3 at lane 820-I, performs add/drop/multiplex/switching functions on the signals, which are then delivered by line output lane 820-O via 16 bit line 204-3 to line input lane 202-I of north switching network 201-3-S. The functionality and advantages of lines 203-3 and 204-3 are described above in connection with FIG. 2.

Eight trib transceivers 832-1 through 832-8 each receive two trib traces, perform retiming and other functions as is known in the art and deliver 4 bits to a trib lane to north switching network 201-3-N and 4 bits to a trib lane to south switching network 201-3-S. For purposes of describing this exemplary embodiment, only two trib transceivers, trib transceiver 832-1 and 832-8 are illustrated for clarity. One skilled in the art will be able to construct a switching core 202 with a fewer or greater number of lines and tribs after studying these examples of this specification.

Trib transceiver 832-1 receives signals via 4 bit trib trace 320-1-I from trib card 308-1 at north trib transceiver 848-1-N, performs retiming and other functions as is known in the art and delivers via 4 bit line 860 to trib lane 810-I of north switching network 201-3-N. North switching network 201-3-N performs add/drop multiplexor/switch/timeslot interchanger functions on the signals, which are then delivered by trib lane 810-O back to north trib transceiver 832-N via 4 bit line 862. North trib transceiver 832-N performs retiming and other functions as known in the art and delivers signals to trib card 308-1 via trib trace 320-1-O.

Trib transceiver 832-1 also receives signals via 4 bit trib trace 320-9-I at south trib transceiver 832-1-S, performs retiming and other functions as is known in the art and delivers signals via 4 bit line 864 to trib lane 820-I of south switching network 201-3-S. South switching network 201-3-S performs add/drop multiplexor/switch/timeslot interchanger functions on the signals, which are then delivered by trib lane 820-I back to south trib transceiver 832-S via 4 bit line 868. South trib transceiver 832-S performs retiming and other functions as known in the art and delivers signals to trib card 308-1 via trib trace 320-9-O.

Trib transceiver 834-1 receives signals via 4 bit trib trace 334-8-I from trib card 308-8 at north trib transceiver 834-8-N, performs retiming and other functions as is known in the art and delivers signals via 4 bit line 870 to trib lane 812-I of north switching network 201-3-N. North switching network 201-3-N performs add/drop multiplexor/switch/timeslot interchanger functions on the signals, which are then delivered by trib lane 812-O back to north trib transceiver 834-8-N via 4 bit line 872. North trib transceiver 834-8-N performs retiming and other functions as known in the art and delivers signals to trib card 308-8 via trib trace 334-8-O.

Trib transceiver 834-8 also receives signals via 4 bit trib trace 334-16-I at south trib transceiver 834-8-S, performs retiming and other functions as is known in the art and delivers signals on 4 bit line 874 to trib lane 824-I of south switching network 201-3-S. South switching network 201-3-S performs add/drop multiplexor/switch/timeslot interchanger functions on the signals, which are then delivered by trib lane 824-O back to south trib transceiver 834-8-S via line 876. South trib transceiver 834-8-S performs retiming and other functions as known in the art and delivers signals to trib card 308-8 via trib trace 334-16-O.

Figure 10:
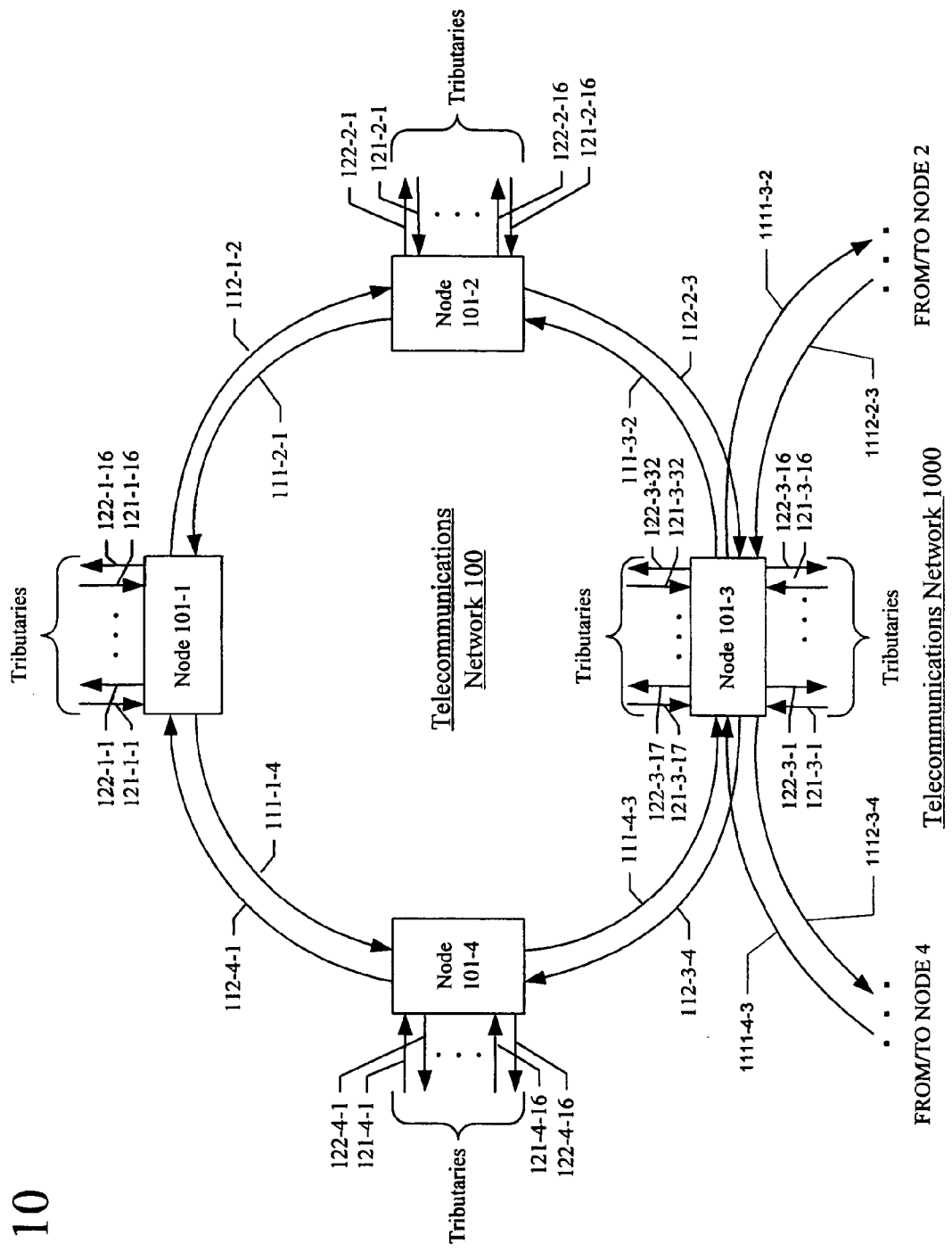
FIG. 10 depicts a schematic diagram of the first SONET/SDH ring of FIG. 1 connected to a second SONET/SDH ring at a switching node in accordance with a further illustrative embodiment of this invention.

Turning now to FIG. 10, an exemplary embodiment of interconnected telecommunications networks is shown. In FIG. 5, telecommunications network 100 is illustrated as connected to telecommunications network 1000 (shown in partial view) at a common node, node 101-3. For purposes of this specification, telecommunications network 1000 comprises four nodes, configured in the same manner as in telecommunications network 100 and are therefore not further discussed. The configuration of node 101-3 is useful in creating network configurations that were not previously possible. In the example of FIG. 10, node 101-3 effects through traffic on telecommunications networks 100 and 1000 and, importantly, effects interchange of signal traffic between telecommunications networks 100 and 1000. Advantageously, node 101-3 was active prior to addition of connections to telecommunications network 1000.

Node 101-3 is constructed in the same or similar manner to node 101-*i* as shown in FIGS. 1-3, after an increase in its capacity according to one aspect of this invention. Node 101-3 comprises two OC-768 line inputs 111-4-3 and 112-2-3 and two OC-768 line outputs 111-3-2 and 112-3-4 in telecommunications network 100. Node 101-3 now also comprises two OC-768 line inputs 611-4-3 and 612-2-3 and two OC-768 line outputs 611-3-2 and 611-3-4 in telecommunications network 500.

Further, node 101-3 is capable of receiving up to 32 OC-192 tributaries, 122-3-1 through 122-3-32 and of spawning 32 OC-192 tributaries, 121-3-1 through 121-3-32. In all respects, node 101-3 is capable of all of the functions as described above in connection with FIG. 1 with double the capacity. While node 101-3 is illustrated in FIG. 5 as having doubled in capacity, in many applications, such capacity is added over time, according to a further aspect of this invention.

Figure 11:
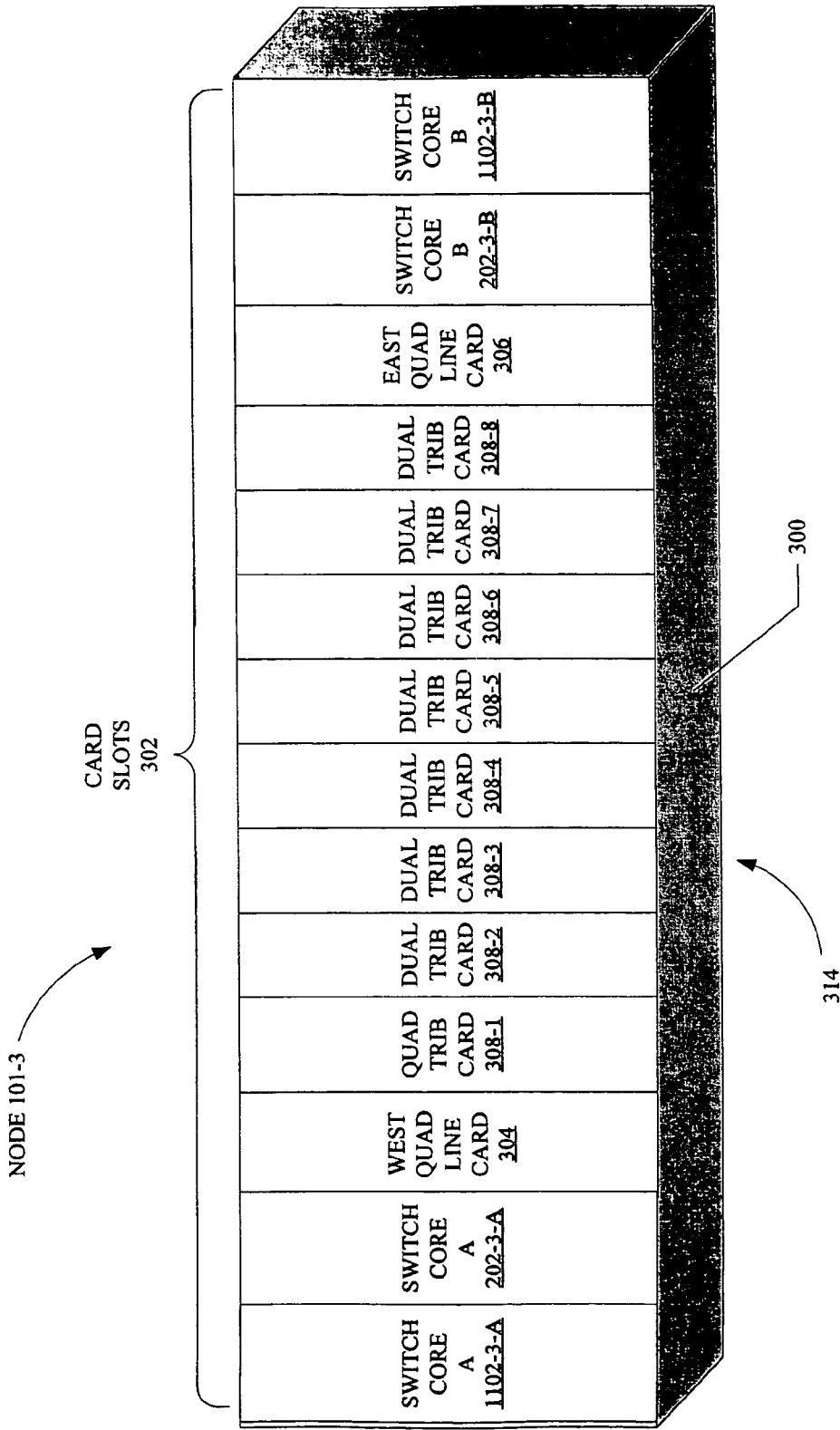
FIG. 11 depicts a perspective of an exemplary physical embodiment of the switching node of FIG. 10 illustrating the component cards in the cabinet of FIG. 3 in a second configuration.

FIG. 11 depicts the physical shelf 300 and card layout of a switching node 101-*i*, herein 101-3 of FIG. 10, in a second, higher-capacity configuration. As in FIG. 3, exemplary switching node 101-3 comprises a single-shelf 300, redundant switching system according to the exemplary embodiment of this invention. A plurality of card slots 302 is available on shelf 300, as is known in the art. According to the exemplary embodiment of this invention, there are 14 card slots 302 available. The shelf is populated, in its high-capacity configuration, with redundant switch cores, switch cores 202-3-A and 202-3-B and, importantly, switch cores 1102-3-A and 1102-3-B. All switch cores 202-3-A, 202-3-B, 1102-3-A and 1102-3-B correspond to switch core 202-3 described above in FIG. 2 and FIG. 9. Switch cores 202-3-A and 202-3-B comprise a first "warm spare" arrangement and switch cores 1102-3-A and 1102-3-B comprise a second "warm spare" arrangement, as is well known in the art, and thus not discussed further.

In this exemplary higher-capacity configuration of this invention, west line card 1104 comprises a dual line card, that is, it can handle twice the capacity of west line card 304, described above in connection with FIG. 6. A dual line card 114 is described in more detail below, in connection with FIG. 16. Dual line card, 1104, west, receives signals on line 111-4-3 from node 101-4 and sends signals on line 112-3-4 to node 101-4. Additionally, dual line card 1104, west, receives signals on line 111-4-3 from node 1004 and sends signals on line 1012-3-4 to node 1004. A dual line card 1106, east receives signals on line 112-2-3 from node 101-2 and sends signals on line 111-3-2 to node 101-2. Additionally, dual line card 1106, east, receives signals on line 1013-2-3 from node 1002 and sends signals on line 1011-3-2 to node 1002.

According to this second, higher capacity configuration of this invention, node 101-3 is populated with 8 trib cards 308 of varying capacity. The example given in FIG. 10 illustrates a high capacity configuration with all trib cards 308 supporting four trib inputs 121-3 and four trib outputs 122-3. In the example of FIG. 11 (and the following FIGS.), node 101-3 is illustrated with a mix of dual and quad trib cards 308 in order to show the versatility of this invention.

In FIG. 3, shelf 300 is further depicted with empty slot 310 and empty slot 312. In the exemplary, higher-capacity embodiment of FIG. 11, the capacity of node 101-3 is effectively doubled by addition of two switching core cards, switch core 1102-3-A and switch core 1102-3-B. By exchanging single line cards and dual trib cards for dual line cards and quad trib cards, respectively, according to this second configuration, the capacity of node 101 effectively increases up to double the depicted capacity. All card slots 302 are connected via backplane 314, which will be described in more detail, below.

Figure 12:
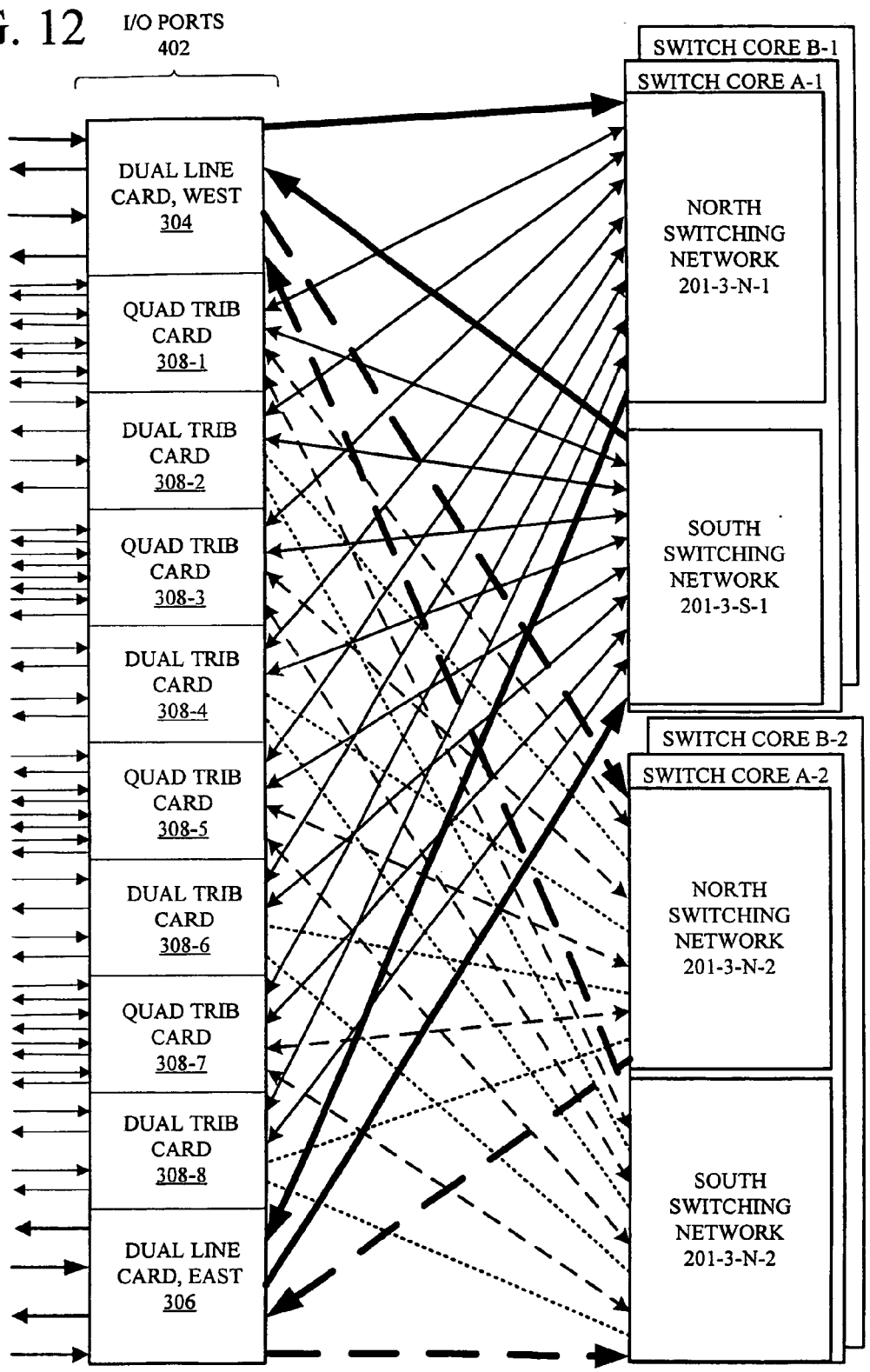
FIG. 12 depicts a logical block diagram of the switching node of FIGS. 10 and 11 illustrating the logical interconnections of the switching node's components in a second configuration.

FIG. 12 depicts a logical block diagram of the physical components of an exemplary node 101-*i*, herein node 101-3 (as above), and the logical interconnections of the physical components according to a second, higher-capacity exemplary embodiment of this invention. In this exemplary embodiment of the physical layout of node 101-3, node 101-3 includes the above-described switching core 203-3-A, which comprises north switching network 201-3-N and south switching network 201-3-S interconnected by lines 203-3 and 204-3, as illustrated. In accordance with common switching node practice, node 101-3 includes a second switching core, switching core 202-3-B. As mentioned above, switching core 202-3-B acts as a "warm spare"; that is, it processes a copy of all signals that switching core 202-3-A processes. When needed, a decision is made as to which switching core 202-3-A or 202-3-B has more accurate signals, and that copy is used. Other configurations as known in the art may be substituted for this 1+1 sparing arrangement without departing from the scope of the appended claims. Further, according to this exemplary embodiment of the physical layout of node 101-3, node 101-3 includes switching core 1102-3-A, which comprises a north switching network 201-3-N and south switching network 201-3-S interconnected by lines 203-3 and 204-3, as illustrated. In accordance with common switching node practice, node 101-3 further includes a second switching core, switching core 1102-3-B. As above, switching core 1102-3-B acts as a "warm spare"; that is, it processes a copy of all signals that switching core 1102-3-A processes. When needed, a decision is made as to which switching core 1102-3-A or 1102-3-B has more accurate signals, and that copy is used. Other configurations as known in the art may be substituted for this 1+1 sparing arrangement without departing from the scope of the appended claims.

In accordance with this exemplary embodiment of this invention, all connections among I/O ports 402 that were illustrated in the lower-capacity configuration of FIGS. 3 and 4 are maintained in FIG. 12. That is, all connections through backplane 314 between I/O ports 402 that support telecommunications network 101 (FIG. 1) remain the same (i.e., connected to switch core 202-3-A and 202-3-B as described above). New connections required to support additional capacity for telecommunications network 1001 (FIG. 10) that cannot be supported by switch core 202-3 are supported by switch core 1102. Thus, when new lines, tribs or both are added to node 101-3, only two switch core cards 1102 need to be added to handle the increased capacity demand, according to this illustrative embodiment of this invention. Therefore, up to double the maximum capacity of the first, lower-capacity switch is supported in the higher-capacity embodiment. According to this description, the lower-capacity node 101 supports 40 Gbps. The higher-capacity supports up to 80 Gbps in almost exactly the same amount of space.

In FIG. 12, solid line arrows indicate connections between the I/O port cards and the switch core cards as illustrated first in FIG. 4. Dashed lines in FIG. 12 indicate new connections across backplane 314 between I/O ports 402 and switch core 1102. Dotted lines in FIG. 12 indicate unused but present connections available on backplane 314 to support further expansion. For example, in FIG. 12 there are four quad trib cards and four dual trib cards. If a dual trib card is replaced by a quad trib card, the dotted lines would support the additional traffic.

Thus, according to the exemplary embodiment of FIG. 12, optical signals from lines 111 and 112 and tribs 121 and 122 are received and transmitted at a plurality of I/O ports 402. In the exemplary embodiment of FIG. 12, I/O ports 402 include dual line card 304, west, that interfaces signals to/from the "west" side 206 of node 101-3. Dual line card 304, west, receives an OC-768 signal from node 1014 on line 111-4-2, in this exemplary embodiment, and transmits an OC-768 signal to node 101-4 on line 112-3-4. Additionally, dual line card 304, west receives an OC-768 signal from node 1001-4 on line 1011-4-2 and transmits an OC-768 signal to node 1001-4 on line 1012-3-4. Dual line card 304, west, performs optical/electrical conversion, retiming, signal replication and switching functions, as will be described in more detail below, in connection with FIG. 16.

I/O ports 402 also comprise dual line card 306; east, that interfaces signals to/from the "east" side 208 of node 101-3. East line card 206 receives an OC-768 signal from node 101-2 on line 111-2-3, in this exemplary embodiment, and transmits an OC-768 signal to node 101-2 on line 112-3-2. Additionally, dual line card 306, east, receives an OC-768 signal from node 1001-2 on line 1012-2-3 and transmits an OC-768 signal to node 1001-2 on line 1011-3-2. Dual line card 306, east, performs optical/electrical conversion, retiming, signal replication and switching functions, as will be described in more detail below, in connection with FIG. 16.

Further, I/O ports 402 comprise a plurality of trib cards 308. There are 8 trib cards, 308-1 through 308-8, in this exemplary embodiment. Trib cards 308-1 through 308-8 comprise a mixture of dual trib and quad trib capacities. Dual trib cards 308-2, 308-4, 308-6 and 308-8 receive/send two OC-192 trib signals. Quad trib cards 308-1, 308-3, 308-5 and 308-7 receive/send four OC-192 trib signals. Other arrangements of trib cards 308 may be implemented by those skilled in the art after reading this specification. An exemplary quad trib card 308 will be described further, below, in connection with FIG. 17.

I/O ports 402 are connected to both switch core 202-3-A and 202-3-B via backplane 314, which will be described in more detail in connection with FIGS. 13, 14 and 15, below. Logically, and in accordance with the description of FIGS. 2 and 10, above, dual line card 304, west, receives an OC-768 signal from node 101-4 on line 111-4-3 and transforms the optical signals into electrical signals, conditions the signals for use in node 101-3 and send them to north switching network 201-3-N of switch core 202-3 along unidirectional 40 Gb/s line 410, according to this embodiment of this invention. North switching network 201-3-N performs add/drop multiplexing, switching and timeslot interchanging, as described above. North switching network 201-3-N sends an output signal to east line card 306 on unidirectional 40 Gb/s line 412. East line card 306 transforms the electrical signals into optical signals and sends them to node 101-2 on line 111-3-2.

Further in accordance with the description of FIGS. 2 and 10, above, dual line card 304, west, receives an OC-768 signal from node 1001-4 on line 1011-4-3 and transforms the optical signals into electrical signals, conditions the signals for use in node 101-3 and send them to north switching network 201-3-N of switch core 1102 along unidirectional 40 Gb/s line 1210, according to this embodiment of this invention. North switching network 201-3-N of switch core 1102 performs add/drop multiplexing, switching and timeslot interchanging, as described above. North switching network 201-3-N of switch core 1102 sends an output signal to dual line card 306, east on unidirectional 40 Gb/s line 1212. East line card 306 transforms the electrical signals into optical signals and sends them to node 1001-2 on line 1011-3-2.

In the opposite direction (i.e., east-to-west), dual line card 306 east receives an OC-768 signal from node 101-2 on line 111-2-3 and transforms the optical signals into electrical signals, conditions the signals for use in node 101-3 and sends the electrical signals to south switching network 201-3-S on unidirectional 40 Gb/s line 414. South switching network 201-3-S performs add/drop multiplexing, switching and timeslot interchanging, as described above. South switching network 201-3-S sends an output signal to west line card 304 on unidirectional 40 Gb/s line 416. West line card 304 transforms the electrical signals into optical signals and sends them to node 101-4 on line 112-3-4.

Further, dual line card 306 east receives an OC-768 signal from node 1001-2 on line 1011-2-3 and transforms the optical signals into electrical signals, conditions the signals for use in node 101-3 and sends the electrical signals to south switching network 201-3-S of switch core 1102 on unidirectional 40 Gb/s line 1214. South switching network 201-3-S of switch core 1102 performs add/drop multiplexing, switching and timeslot interchanging, as described above. South switching network 201-3-S of switch core 1102 sends an output signal to dual line card 304 west on unidirectional 40 Gb/s line 1216. West line card 304 transforms the electrical signals into optical signals and sends them to node 1001-4 on line 1012-3-4.

According to this exemplary embodiment, trib cards 308 receive up to 32 OC-192 inputs, as illustrated. Each trib card performs optical to electrical conversion and sends the signals to north switching network 201-3-N and south switching network 201-3-S of switch core 202 and, potentially, to switching network 201-3-N and south switching network 201-3-s of switch core 1102 via 10 Gb/s links. For purposes of clarity of this drawing of node 101-3, the links are bidirectional; therefore, each trib card also receives a 10 Gb/s signal from both the north switching network 201-3-N and south switching network 201-3-S of switch core 202 and north switching network 201-3-N and south switching network 201-3-S of switch core 1102. For purposes of describing this invention, trib card 308-1 is a quad trib card, and thus receives optical signals on tribs 121-3-1, 121-3-9, 121-3-17 and 121-3-25 and sends electrical signals on link 420 to north switching network 201-3-N and on link 421 to south switching network 201-3-S of switch core 202, respectively. Trib card 308-1 also sends electrical signals on link 1220 to north switching network 201-3-N of switch core 1102 and on link 1221 to south switching network 201-3-S of switch core 1102, respectively. Trib card 308-1 receives electrical signals from north switching network 201-3-N of switch core 202 on link 420 and from south switching network 201-3-S of switch core 202 on link 421 and transmits optical signals on tribs 122-3-1 and 122-3-9, respectively. Quad trib card 308-1 also receives electrical signals from north switching network 201 of switch core 1102 on link 1220 and from south switching network 201 of switch core 1102 on link 1221.

Dual trib card 308-2 receives optical signals on tribs 121-3-2 and 121-3-10 and sends electrical signals on link 422 to north switching network 201-3-N and on link 423 to south switching network 201-3-S, respectively. Trib card 308-2 receives electrical signals from north switching network 201-3-N on link 422 and from south switching network 201-3-S on link 423 and transmits optical signals on tribs 122-3-2 and 122-3-10, respectively. If trib card 208-2 is changed to a quad trib card, unused connections 1222 and 1223 are available to connect trib card 308-2 to north switching network and south switching network of switch core 1102, respectively.

Quad trib card 308-3 receives optical signals on tribs 121-3-3 and 121-3-11 and sends electrical signals on link 424 to north switching network 201-3-N and on link 425 to south switching network 201-3-S of switch core 202, respectively. Quad trib card 308-3 also receives optical signals on tribs 121-3-19 and 121-3-27 and sends corresponding electrical signals on link 1224 to north switching network 201 and on line 1245 to south switching network of switch core 1102, respectively.

Quad trib card 308-3 receives electrical signals from north switching network 201-3-N of switch core 201 on link 424 and from south switching network 201-3-S of switch core 201 on link 425 and transmits corresponding optical signals on tribs 122-3-3 and 122-3-11, respectively. Quad trib card 308-3 also receives electrical signals from north switching network 201 of switch core 202 on link 1224 and from south switching network 201 of switch core 1102 on link 1225 and transmits corresponding optical signals on tribs 122-3-19 and 122-3-17, respectively.

Dual trib card 308-4 receives optical signals on tribs 121-3-4 and 121-3-12 and sends electrical signals on link 426 to north switching network 201-3-N and on link 427 to south switching network 201-3-S, respectively. Trib card 308-4 receives electrical signals from north switching network 201-3-N on link 426 and from south switching network 201-3-S on link 427 and transmits optical signals on tribs 122-3-4 and 122-3-12, respectively. If trib card 208-4 is changed to a quad trib card, unused connections 1226 and 1227 are available to connect trib card 308-4 to north switching network and south switching network of switch core 1102, respectively.

Quad trib card 308-5 receives optical signals on tribs 121-3-5 and 121-3-13 and sends electrical signals on link 428 to north switching network 201-3-N of switch core 202 and on link 429 to south switching network 201-3-S of switch core 202, respectively. Quad trib card 208-5 also receives optical signals on tribs 121-3-21 and 121-3-29 and sends electrical signals on link 1228 to north switching network 201 of switch core 1102 and on link 1229 to south switching network 201 of switch core 1102. Quad trib card 308-5 receives electrical signals from north switching network 201-3-N on link 428 and from south switching network 201-3-S on link 429 and transmits optical signals on tribs 122-3-5 and 122-3-13, respectively. Quad trib card 308-5 also receives electrical signals form north switching network 201 of switch core 1102 on link 1228 and on link 1229 from south switching network 201 of switch core 1102 and transmits optical signals on tribs 122-3-21 and 122-3-29, respectively.

Dual trib card 308-6 receives optical signals on tribs 121-3-6 and 121-3-14 and sends electrical signals on link 430 to north switching network 201-3-N and on link 431 to south switching network 201-3-S, respectively. Trib card 308-2 receives electrical signals from north switching network 201-3-N on link 430 and from south switching network 201-3-S on link 431 and transmits optical signals on tribs 122-3-6 and 122-3-14, respectively. If trib card 208-6 is changed to a quad trib card, unused connections 1230 and 1231 are available to connect trib card 308-6 to north switching network and south switching network of switch core 1102, respectively.

Quad trib card 308-7 receives optical signals on tribs 121-3-7 and 121-3-15 and sends electrical signals on link 432 to north switching network 201-3-N of switch core 202 and on link 433 to south switching network 201-3-S of switch core 202, respectively. Quad trib card 208-7 also receives optical signals on tribs 121-3-25 and 121-3-31 and sends electrical signals on link 1232 to north switching network 201 of switch core 1102 and on link 1233 to south switching network 201 of switch core 1102, respectively. Quad trib card 308-7 receives electrical signals from north switching network 201-3-N of switch core 202 on link 432 and from south switching network 201-3-S of switch core 202 on link 433 and transmits optical signals on tribs 122-3-7 and 122-3-15, respectively. Additionally, quad trib card 308-7 receives electrical signals from north switching network 201 of switch core 1102 on link 1232 and from south switching network 201 of switch core 1102 on link 1233 and transmits optical signals on tribs 122-3-25 and 121-3-31, respectively.

Finally, dual trib card 308-8 receives optical signals on tribs 121-3-8 and 121-3-16 and sends electrical signals on link 434 to north switching network 201-3-N and on link 435 to south switching network 201-3-S, respectively. Trib card 308-8 receives electrical signals from north switching network 201-3-N on link 434 and from south switching network 201-3-S on link 435 and transmits optical signals on tribs 122-3-8 and 122-3-16, respectively. If trib card 208-8 is changed to a quad trib card, unused connections 1234 and 1235 are available to connect trib card 308-8 to north switching network 201 and south switching network 201 of switch core 1102, respectively.

Figure 13:
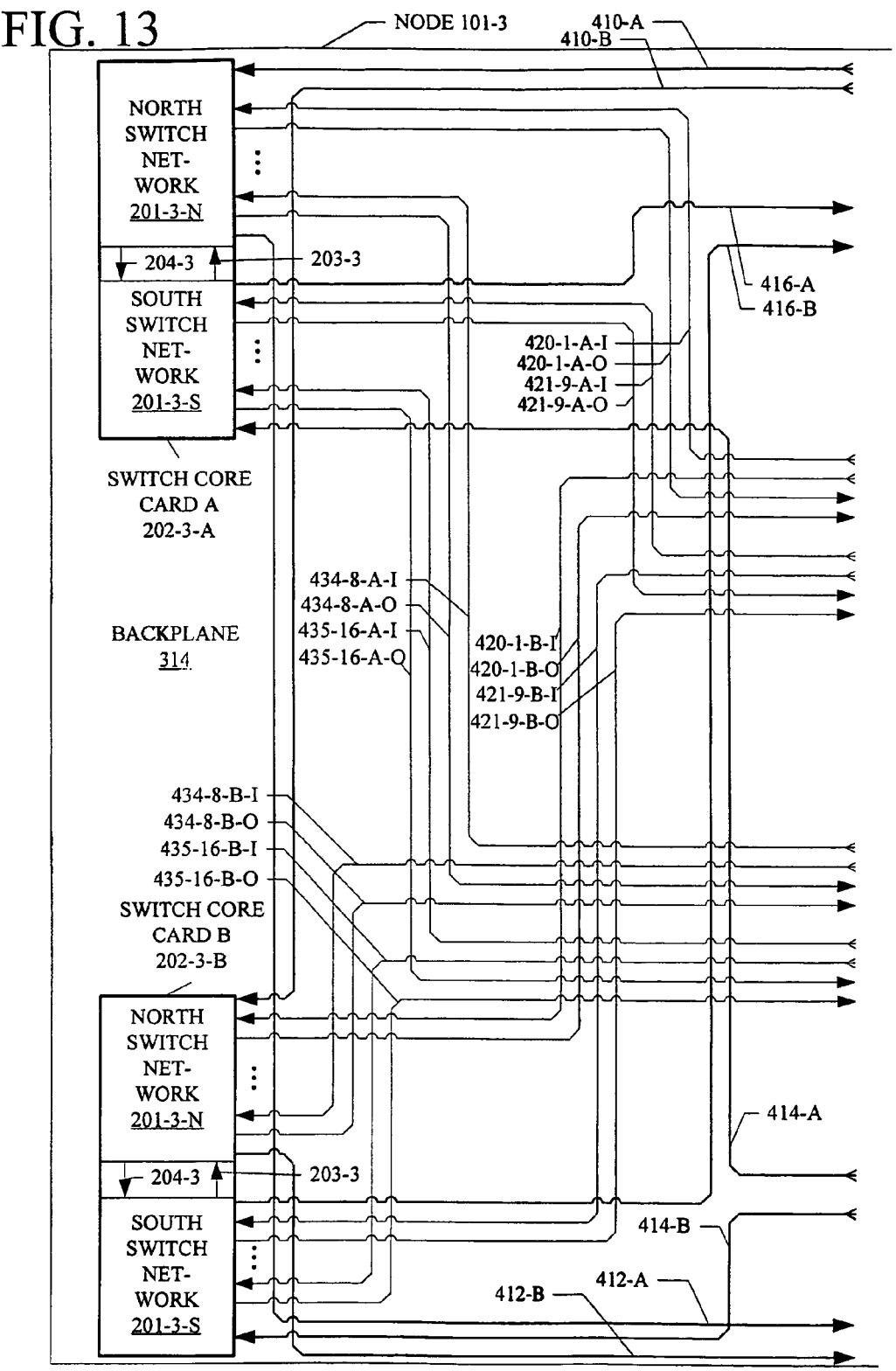
FIG. 13 depicts a first half of an exemplary block diagram of the backplane of the switching node of FIG. 10 in accordance with a first aspect of this invention.
Figure 14:
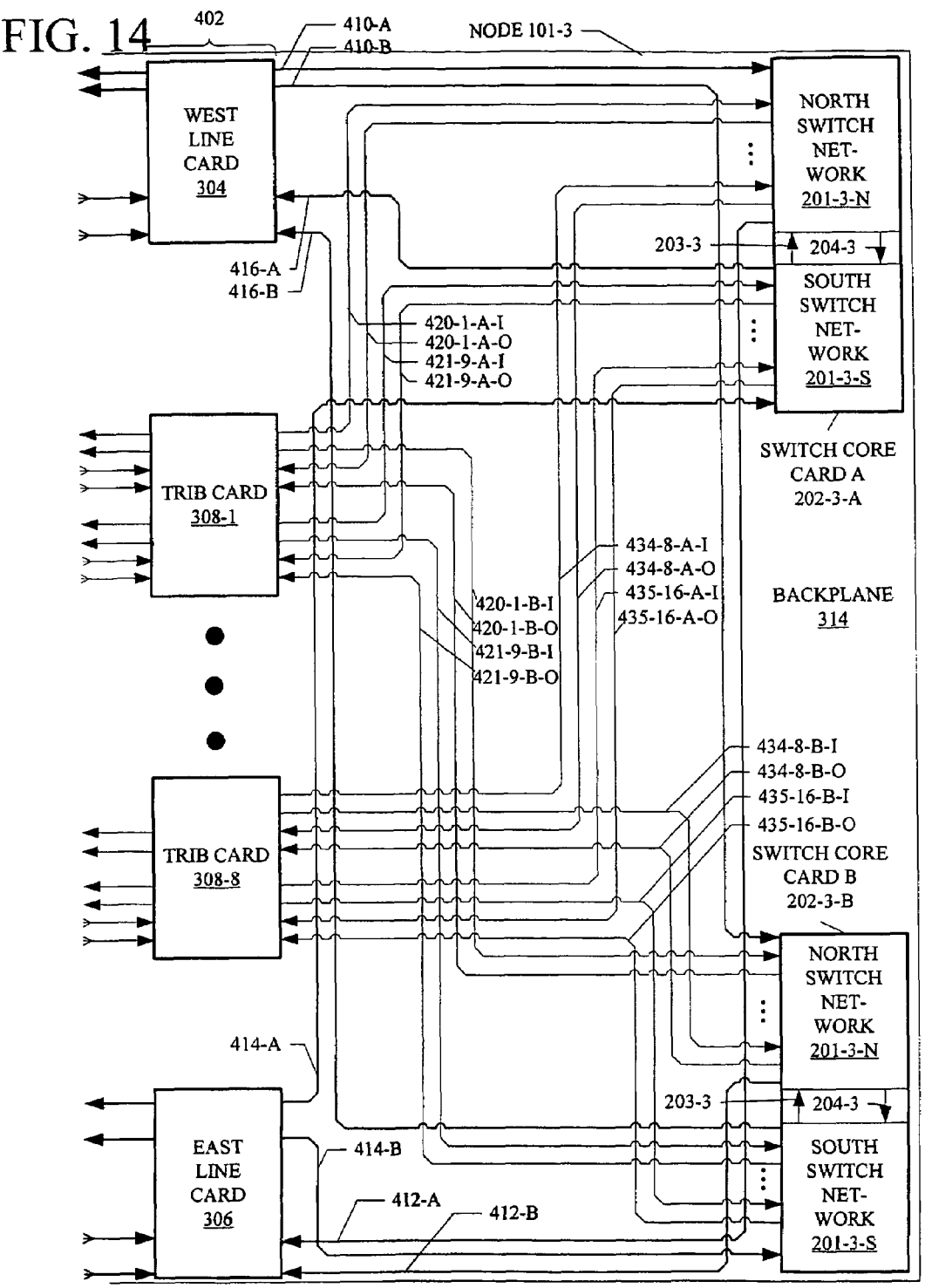
FIG. 14 depicts a second half of the exemplary block diagram of the backplane of the switching node of FIG. 1—in accordance with a first aspect of this invention.
Figure 15:
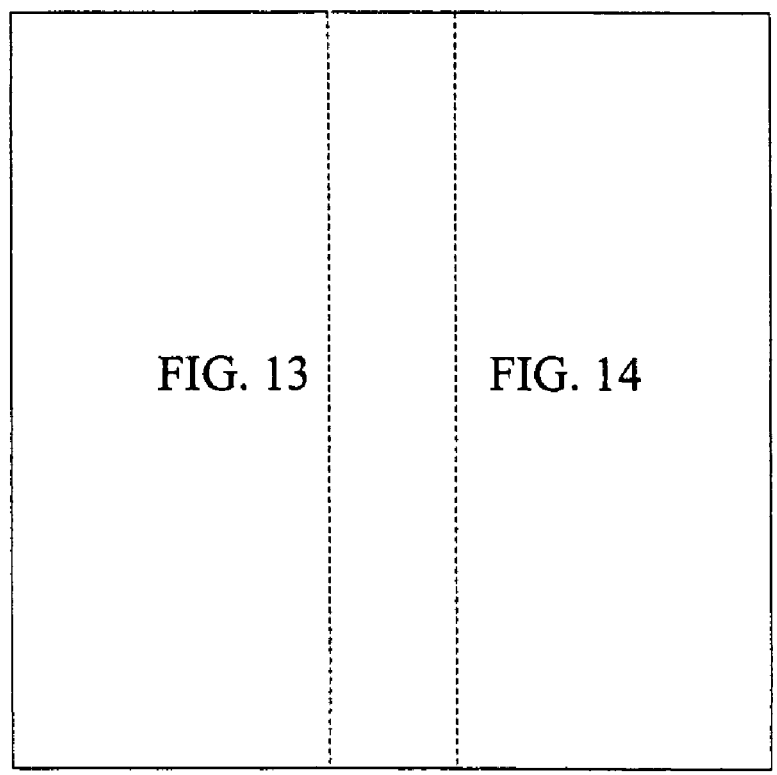
FIG. 15 depicts the relationship between FIGS. 13 and 14.

FIGS. 13, 14 and 15 are a block diagram of node 101-$i$ of FIG. 2 in a more complete view as compared to FIG. 5, illustrating full backplane connectivity. FIG. 15 illustrates how FIGS. 13 and 14 connect. In FIG. 5, the optical connections were illustrated to show how the node of this invention is connected to the outside world. In the illustration of FIGS. 13 and 14, the optical connections are not shown in order to illustrate backplane 314 more fully. FIGS. 13 and 14 illustrate that node 101-$i$ comprises a backplane 314 that supports twice the capacity as illustrated in the partial view of backplane 314 of FIG. 5.

FIGS. 13 and 14 of this exemplary embodiment of this invention depicts a block diagram of physical connections between I/O ports 402 and switch cores 202-3-A, 202-3-B, 1102-A and 1102-B across an exemplary backplane 314 of node 101-3 according to another aspect of this invention. Dual line cards 304 and 306 and dual and quad trib cards 308-1 through 308-8 are connected to backplane 314. Backplane 314 comprises a plurality of uni-directional traces that carry electrical signals between the I/O ports 402 and switching cores 202-3-A, 202-3-B, 1102-A and 1102-B of node 101-3. In this exemplary embodiment of switching node 101-3, dual line card 304 west receives an OC-768 from node 1014 on line 111-4-3 and transmits an OC-768 signal to node 101-2 on line 112-3-4; and receives an OC-768 signal from node 1001-4 on line 1011-4-3 and transmits an OC-768 signal to node 1001-2 on line 1012-3-4. West line card performs optical/electrical conversion, retiming and signal replication to effect redundancy.

West line card 304 sends identical copies of line 111-4-3's OC-768 signal into backplane 314 to north switching network 201-3-N in switch core 202-3-A on line trace 410-A and to north switching network 201-3-N in switch core 202-3-B on line trace 410-B. These signals are processed by north switching network 201-3-N in switch core 202-3-A and north switching network 201-3-N in switch core 202-3-B and delivered to east line card 306 on line traces 312-A and 312-B, respectively. East line card 306 selects one of the signals, performs electrical/optical conversion and sends the resulting optical signal on line 111-3-2 to node 101-2.

Additionally, dual line card 304 west sends identical copies of OC-768 signals from line 1011-4-3's into backplane 314 to north switching network 201-3-N in switch core 1102-3-A on line trace 1210-A and to north switching network 201-3-N in switch core I 102-3-B on line trace 1210-B. These signals are processed by north switching network 201-3-N in switch core 1102-3-A and north switching network 201-3-N in switch core 1102-3-B and delivered to east line card 306 on line traces 1212-A and 1212-B, respectively. East line card 306 selects one of the signals, performs electrical/optical conversion and sends the resulting optical signal on line 1011-3-2 to node 1001-2.

Dual line card 306 east receives an OC-768 signal on line 112-2-3 from node 101-2. East line card 306 performs optical/electrical conversion, retiming and signal replication and then transmits identical signals on line trace 314-A to south switching network 201-3-S in switch core 202-3-A and on line trace 314-B to south switching network 201-3-S in switch core 202-3-B. These signals are processed by south switching network 201-3-S in switch core 202-3-A and south switching network 201-3-S in switch core 202-3-B and delivered to west line card 304 on line traces 316-A and 316-B, respectively. West line card 304 selects one of the signals, performs electrical/optical conversion and sends the resulting optical signal on line 112-3-4 to node 101-4.

Dual line card 306 east also receives an OC-768 signal on line 1012-2-3 from node 1001-2. East line card 306 performs optical/electrical conversion, retiming and signal replication and then transmits identical signals on line trace 1214-A to south switching network 201-3-S in switch core 1102-3-A and on line trace 1214-B to south switching network 201-3-S in switch core 1102-3-B. These signals are processed by south switching network 201-3-S in switch core 1102-3-A and south switching network 201-3-S in switch core 1102-3-B and delivered to dual line card 304 west on line traces 316-A and 316-B, respectively. Dual line card 304 west selects one of the signals, performs electrical/optical conversion and sends the resulting optical signal on line 1012-34 to node 1001-4.

Returning briefly to FIGS. 11 and 12, there is a plurality of trib cards 308-1 through 308-8 connected to backplane 314. Four quad trib cards and four dual trib cards are illustrated, to show the versatility of the present invention. For purposes of clarity in FIGS. 13 and 14, and for purposes of parallelism with FIG. 5, only quad trib card 308-1 and dual trib card 308-8 are illustrated here. One skilled in the art will be able to design a complete backplane 314 including the connections for all eight trib cards after studying these drawings and the accompanying text.

In the exemplary embodiment of FIGS. 13 and 14, quad trib card 308-1 receives an OC-192 signal on trib 121-3-1, performs optical/electrical conversion, retiming and signal replication and then transmits corresponding electrical signals on trib trace 320-1-I (wherein "1" stands for "trib 1" and "I" stands for "input" to switching network) to north switching network 201 in switch core 202-3-A and on trib trace 321-1-I to north switching network 201 in switch core 202-3-B. North switching networks 201 in both switch core 202-3-A and switch core 202-3-B perform their switching functions on the input signals and send electrical output signals to trib card 308-1 on trib trace 320-1-O (wherein "O" stands for "output" from switch network) and trib trace 321-1-O, respectively. Trib card 308-1 selects one of the signals, performs electrical/optical conversion and sends the resulting signal on trib 122-3-1.

Quad trib card 308-1 receives an OC-192 signal on trib 121-3-9 performs optical/electrical conversion, retiming and signal replication and then transmits identical signals on trib trace 320-9-I (wherein "9" stands for "trib 9" and "I" stands for "input") to south switch network 201-3-S in switch core 202-3-A and on trib trace 321-9-I to south switch network 201-3-S in switch core 202-3-B. South switch network 201-3-S in switch core 202-3-A and south switch network 201-3-S in switch core 202-3-B perform their switching functions on the input signals and send output signals to trib card 308-1 on trib trace 320-9-O (wherein "O" stands for "output") and the trace 321-9-O, respectively. Trib card 308-1 selects one of the signals, performs electrical/optical conversion and sends the resulting signal on trib 122-3-9.

According to the exemplary embodiment of FIGS. 11-14, quad trib card also receives an OC-192 signal on trib 121-3-17, performs optical/electrical conversion, retiming and signal replication and then transmits identical signals on trib trace 1220-17-I to north switching network in switch core 1102-A and on trib trace 1221-17-I to north switch network 201-3-N in switch core 1102-B. North switching networks 201 in both switch core 1102-3-A and switch core 1102-3-B perform their switching functions on the input signals and send electrical output signals to trib card 308-1 on trib trace 1220-1-O (wherein "O" stands for "output" from switch network) and trib trace 1221-1-O, respectively. Trib card 308-1 selects one of the signals, performs electrical/optical conversion and sends the resulting signal on trib 122-3-17.

Finally, quad trib card also receives an OC-192 signal on trib 121-3-33, performs optical/electrical conversion, retiming and signal replication and then transmits identical signals on trib trace 1221-17-I to south switching network in switch core 1102-A and on trib trace 1221-17-I to south switch network 201-3-N in switch core 1102-B. South switching networks 201 in both switch core 1102-3-A and switch core 1102-3-B perform their switching functions on the input signals and send electrical output signals to trib card 308-1 on trib trace 1221-1-O (wherein "O" stands for "output" from switch network) and trib trace 1221-1-O, respectively. Trib card 308-1 selects one of the signals, performs electrical/optical conversion and sends the resulting signal on trib 122-3-33.

According to this exemplary embodiment, dual trib card 308-8 receives an OC-192 signal on trib 121-3-8 performs optical/electrical conversion, retiming and signal replication and then transmits identical signals on trib trace 334-8-I (wherein "8" stands for "trib 8" and "I" stands for "input") to switch core 202-3-A and on trib trace 335-8-I to switch core 202-3-B. Switch core 202-3-A and switch core 202-3-B perform their switching functions on the input signals and send output signals to trib card 308-1 on trib trace 334-8-O (wherein "O" stands for "output") and trib trace 335-8-O, respectively. Trib card 308-8 selects one of the signals, performs electrical/optical conversion and sends the resulting signal on trib 122-3-8.

Furthermore, trib card 308-8 receives an OC-192 signal on trib 121-3-16 performs optical/electrical conversion, retiming and signal replication and then transmits identical signals on trib trace 334-16-I (wherein "16" stands for "trib 16" and "I" stands for "input") to switch core 202-3-A and on trib trace 335-16-I to switch core 202-3-B. Switch core 202-3-A and switch core 202-3-B perform their switching functions on the input signals and send output signals to trib card 308-8 on trib trace 334-16-O (wherein "O" stands for "output") and trib trace 335-16-O, respectively. Trib card 308-8 selects one of the signals, performs electrical/optical conversion and sends the resulting signal on trib 122-3-16.

Trib traces X and Y connect card slot 308-8 to switch cores 1102-A and 1102-B. Trib traces are shown herein as dotted lines, because they are not actively carrying signals. If and when dual trib card 308-8 is replaced by a quad trib card, these traces actively carry signals, as described above.

Figure 16:
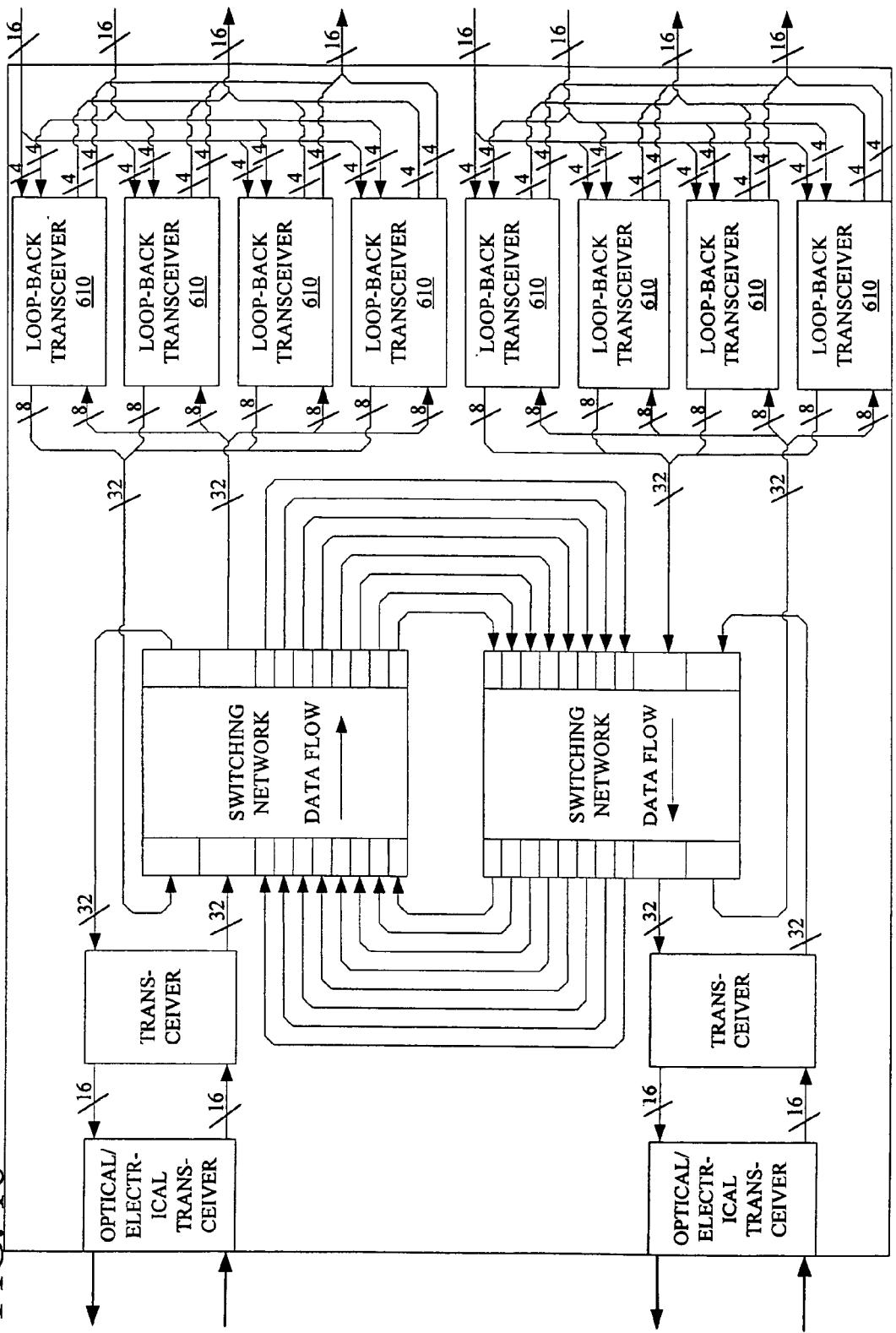
FIG. 16 depicts a block diagram of a dual OC-768 line card in accordance to another aspect of an illustrative embodiment of this invention.

Turning to FIG. 16, an exemplary dual OC-768 line card is illustrated generally at 1600. Dual line card 1304 west is illustrated in more detail. According to this exemplary embodiment, dual line card 1304 west receives an OC-768 signal from optical line 111-4-3 at optical/electrical transceiver 1602. Further, dual line card 1304 west receives an OC-768 signal from optical line 1011-4-2 at optical/electrical transceiver 1604.

Optical/electrical transceivers 1602 performs optical to electrical conversion as is known in the art and transmits the resultant electrical signals over 16-bit bus 1606 at 2.5 Gb/s to transceiver 1608. Optical/electrical transceivers 1604 performs optical to electrical conversion as is known in the art and transmits the resultant electrical signals over 16-bit bus 1610 at 2.5 Gb/s to transceiver 1612.

Transceivers 1608 and 1612 perform deserialization and timing functions as is known in the art and transmits the resultant electrical signals over 32 bit busses 1614 and 1616, respectively, at 1.25 Gb/s on each bus.

In this exemplary embodiment of a dual line card 1600, a first switching network 1620 and a second switching network 1622 provide switching of STS-level signals so that appropriate signals (as determined at provisioning) are delivered to the destination switching network. First switching network 1620 and second switching network 1622 provide a pre-switching stage. First switching network 1620 and second switching network 1622 each comprise a switching network as described in the above-incorporated U.S. patent application Ser. No. 09/7_____. This switching network is exemplary, other switching networks as known in the art may be substituted without departing from the scope of the appended claims.

In order to illustrate the interconnection of first switching network 1620 to second switching network 1622 in a clear manner, data flow in first switching network 1620 is from right to left in FIG. 16 and data flow in second switching network 1622 is from left to right in FIG. 16. Thus, switching network 1620 has a plurality of input lanes 1630 and a plurality of output lanes 1632. Likewise, switching network 1622 has a plurality of input lanes 1634 and a plurality of output lanes 1636. Eight of the output lanes of switching network 1620 are connected to eight of the input lanes of switching 1622 by lies 1638 and eight of the output lanes of switching network 1622 are connected to eight of the input lanes of switching 1620 by lines 1640. Such interconnection of first switching network 1620 and second switching network 1622 provides the capability to exchange data between the signals in telecommunications network 100 and the signals in telecommunications network 1000.

One output of first switching network 1620 comprises 32 bit bus 1642, which delivers eight bits to each of four loop-back transceivers 510-1 through 4. In this exemplary embodiment of this invention, loopback transceivers 510-1 and 510-2 comprise one integrated circuit 512-1 and loop back transceivers 510-3 and 510-4 comprise a second integrated circuit 512-2. Loop back transceivers 510-1 through 4 each receive 8 bit from switching network 620 and transmits 4 bits (16 bits total) at 2.5 Gb/s across backplane 314 to north switching network of switch core 202, north on trace 410-A and to switch core B, north on trace 410-B.

One output of second switching network 1622 comprises 32 bit bus 1644, which delivers eight bits to each of four loop-back transceivers 510-1 through 4. In this exemplary embodiment of this invention, loop-back transceivers 510-1 and 510-2 comprise one integrated circuit 512-1 and loop back transceivers 510-3 and 510-4 comprise a second integrated circuit 512-2. Loop back transceivers 510-1 through 4 each receive 8 bit from switching network 1622 and transmits 4 bits (16 bits total) at 2.5 Gb/s across backplane 314 to switch core 1102-A, north on trace 1210-A and to switch core 1102-B, north on trace 1210-B.

In the opposite direction, dual line card receives 16 bits at 2.5 Gb/s from switch core A, south on trace 416-A and 16 bits at 2.5 Gb/s from switch core B, south on trace 416-B. Four bits from each trace 416-A and 416-B are delivered to each loop back transceiver 510-1 through 4. Loop back transceivers 510-1 through 4 perform signal selection, timing and deserialization and deliver 8 bits each in parallel to 32 bit bus 1646 at 1.25 Gb/s. Bus 1646 delivers data to an input lane of first switching network 1620. Switching network 1620 switches the data and delivers a 32 bit output to bus 1648. Transceiver 1608 receives signals from bus 1648, performs serialization and delivers 16 bits at 2.5 Gb/s on line 1650 to optical/electrical transceiver 1602. Optical/electrical transceiver 1602 performs electrical to optical conversion, and transmits optical signals on OC-768 line 112-3-4.

Additionally, dual line card receives 16 bits at 2.5 Gb/s from switch core A, south on trace 1216-A and 16 bits at 2.5 Gb/s from switch core B, south on trace 1216-B. Four bits from each trace 1216-A and 1216-B are delivered to each loop back transceiver 510-1 through 4. Loop back transceivers 510-1 through 4 perform signal selection, timing and deserialization and deliver 8 bits each in parallel to 32 bit bus 1652 at 1.25 Gb/s. Bus 1652 delivers data to an input lane of second switching network 1622. Switching network 1622 switches the data and delivers a 32 bit output to bus 1654. Transceiver 16012 receives signals from bus 1654, performs serialization and delivers 16 bits at 2.5 Gb/s on line 1656 to optical/electrical transceiver 1604. Optical/electrical transceiver 1604 performs electrical to optical conversion, and transmits optical signals on OC-768 line 1012-3-4.

Figure 17:
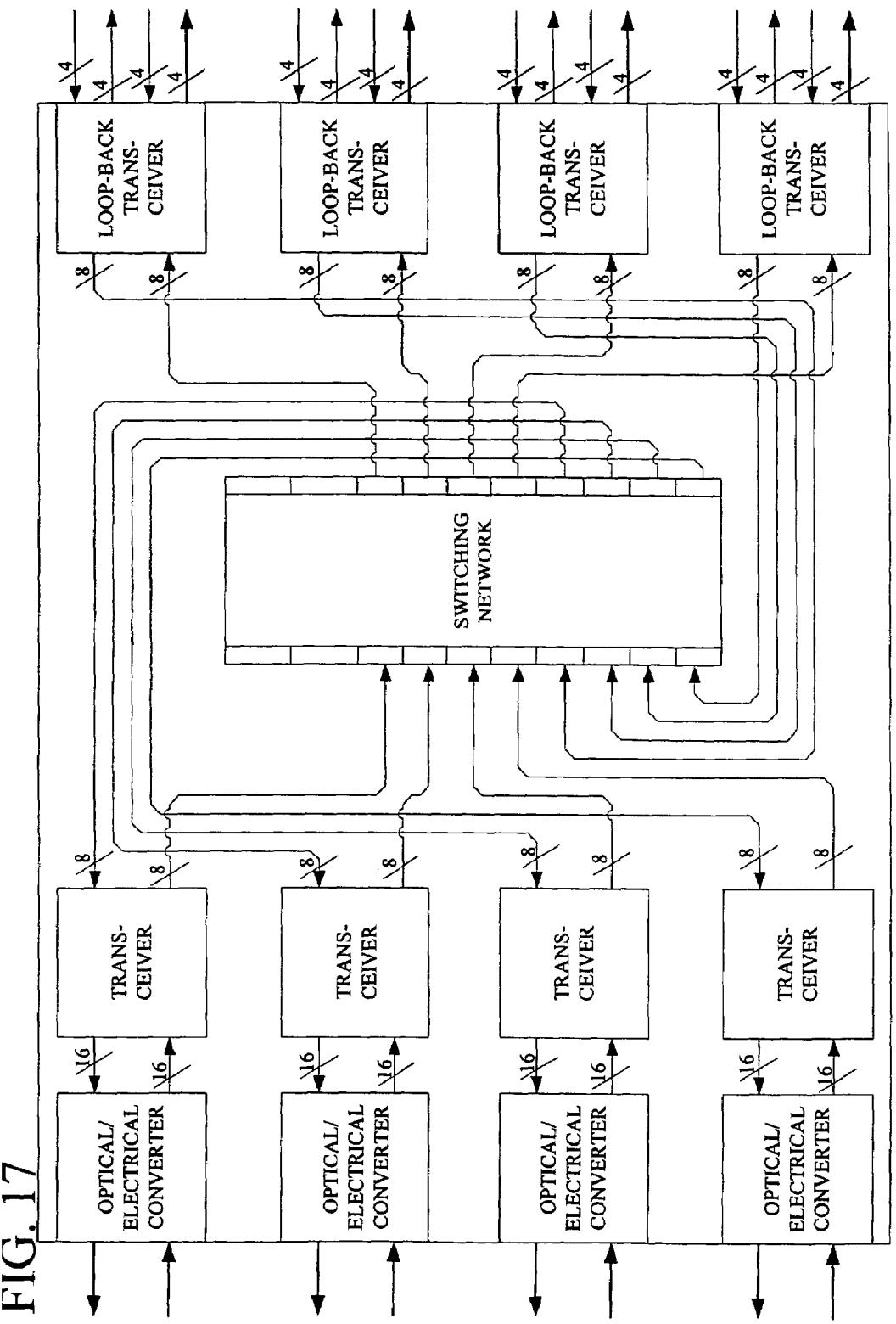
FIG. 17 depicts a block diagram of a quad OC-192 trib card in accordance with a further aspect of an illustrative embodiment of this invention.

Turning to FIG. 17, an exemplary quad trib card 308-1 is shown in a more detailed block diagram. Quad trib card 308-1 receives four OC-192 optical signals 121-3-1, 121-3-9, 121-3-17 and 121-3-25 from tributary sources, which are known in the art. Tributary signal 121-3-1 is received at optical/electrical transceiver 1702 and tributary signal 121-3-9 is received at optical/electrical transceiver 1704. Tributary signal 121-3-17 is received at optical/electrical transceiver 1706 and tributary signal 121-3-25 is received at optical/electrical transceiver 1708. Optical/electrical transceivers 1702, 1704, 1706 and 1708 convert the OC-192 signals to electrical signals, as known in the art.

Optical electrical transceivers 1702, 1704, 1706 and 1708 deliver electrical signals on buses 1712, 1714, 1716 and 1718 to transceivers 1722, 1724, 1726 and 1728, respectively. Transceivers 1722, 1724, 1726 and 1728 each perform serialization and retiming functions as are known in the art, in preparation of sending the signals into switching network 1730. Switching network 1730 is the same or similar to switching networks set forth above. Switching network 1730 includes a plurality of input lanes 1732 and a plurality of output lanes 1734. Transceiver 1722 delivers signals to an input lane of switching network 1730 over 8-bit bus 1742 and transceiver 1724 delivers signals to another input lane of switching network 1730 over 8-bit bus 1742. Likewise, transceiver 1726 delivers signals to an input lane of switching network 1730 over 8-bit bus 1746 and transceiver 1728 delivers signals to another input lane of switching network 1730 over 8-bit bus 1748.

Switching network 1730 performs its switching function, including switching signals to their previously provisioned switching network and delivers electrical signals over 8 bit bus 1752 at 622 Mb/s from output lanes 1734 to loop-back transceiver 710-1 and over 8 bit bus 1754 at 622 Mb/s to loop-back transceiver 710-2. Switching network 1730 also delivers electrical signals over 8 bit bus 1756 at 622 Mb/s from output lanes 1734 to loop-back transceiver 710-3 and over 8 bit bus 1758 to loop-back transceiver 710-4. Loop back transceivers 710-1 and 710-2 perform replication, retiming and serialization functions, as are known in the art. In this exemplary embodiment, loop-back transceiver 710-1 and loop-back transceiver 710-2 comprise a single integrated circuit 712.

Loop back transceiver 710-1 delivers 4 bits at 2.5 Gb/s over backplane 314 to switch A, north on trace 320-1-I and 4 bits at 2.5 Gb/s over backplane 314 to switch B, north on trace 321-1-I. Loop back transceiver 710-2 delivers 4 bits at 2.5 Gb/s over backplane 314 to switch A, south on trace 320-9-I and 4 bits at 2.5 Gb/s over backplane 314 to switch B, south on trace 320-9-I. Loop back transceiver 710-3 delivers 4 bits at 2.5 Gb/s over backplane 314 to switch A, north on trace 1220-1-I and 4 bits at 2.5 Gb/s over backplane 314 to switch B, north on trace 1221-1-I. Loop back transceiver 710-2 delivers 4 bits at 2.5 Gb/s over backplane 314 to switch A, south on trace 1220-9-I and 4 bits at 2.5 Gb/s over backplane 314 to switch B, south on trace 1220-9-I.

In the opposite direction, quad trib card 308-1 receives 4 bits from switch A, north on trace 320-1-O and switch B, north on trace 321-1-O at loop back transceiver 710-1. Trib card 308-1 also receives 4 bits from switch A, south on trace 321-9-O and 4 bit from switch B, south on trace 321-9-O at loop back transceiver 710-2. In addition, quad trib card 308-1 receives 4 bits from switch A, north on trace 1220-1-O and switch B, north on trace 1221-1-O at loop back transceiver 710-3. Trib card 308-1 also receives 4 bits from switch A, south on trace 1221-9-O and 4 bit from switch B, south on trace 1221-9-O at loop back transceiver 710-4.

Loop back transceivers 710-1, 710-2, 710-3 and 710-4 each select one of the signals and deserialize them. Loopback transceivers 710-1 and 710-2 deliver their signals to 16 bit buses 1762 and 1764, respectively, which are delivered to two input lanes 1732 of switching network 1730. Loopback transceivers 710-3 and 710-4 deliver their signals to 16 bit buses 1764 and 1768, respectively, which are delivered to two other input lanes 1732 of switching network 1730. It is to be noted here that two input and two output lanes of switching network 1730 are not used. In an alternative embodiment, these two lanes may be connected to each other to facilitate cross-connection of data.

Two output lanes 1734 of switching network 1730 deliver signals to 8 bit buses 1772 and 1774, which deliver the signals to transceivers 1722 and 1724, respectively. Two output lanes 1734 of switching network 1730 deliver signals to 8 bit buses 1776 and 1778, which deliver the signals to transceivers 1726 and 1726, respectively. Transceivers 1722, 1724, 1726 and 1728 perform deserialization and retiming functions. Transceivers 1722 and 1724 deliver electrical signals on 16 bit buses to optical/electrical transceivers 1702 and 1704, respectively. Transceivers 1726 and 1728 deliver electrical signals on 16 bit buses to optical/electrical transceivers 1706 and 1708, respectively. Optical/electrical transceivers 1702, 1704, 1706 and 1708 convert the electrical signals to OC-192 optical signals. The optical signals are sent out on trib 122-3-1, 122-3-9, 122-3-17 and 122-3-25, respectively.

Thus, this embodiment of this invention can provide at least double the switching capacity of a node in the same amount of space. The service provider needs to buy no more equipment than needed to meet a particular capacity. As capacity requirements increases, the service provider may quickly and easily increase capacity without having to perform a "fork lift" upgrade.

Figure 18:
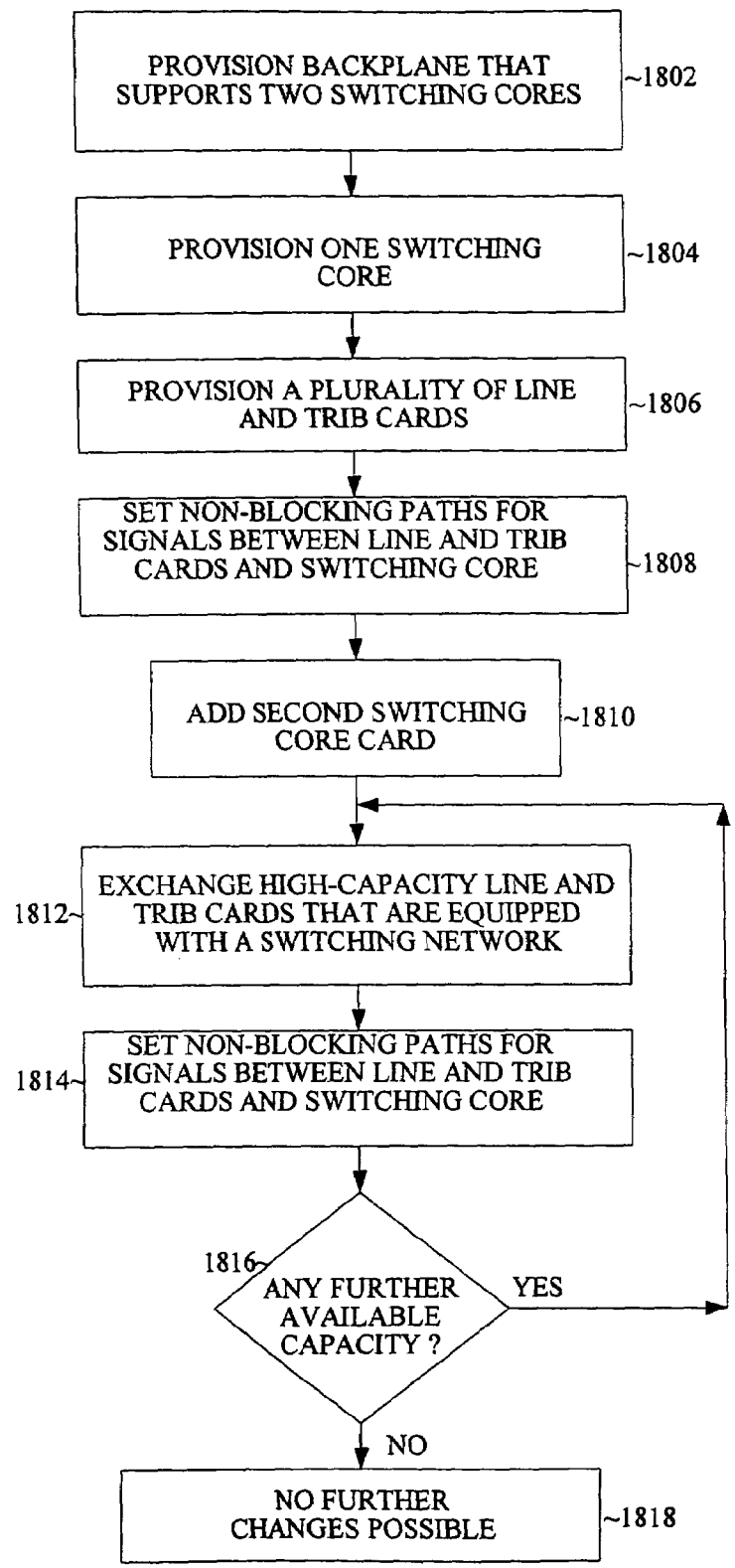
FIG. 18 depicts a flow chart for upgrading the switching node of FIG. 4 to the configuration of FIG. 12 in accordance with an illustrative embodiment of this invention.

FIG. 18 illustrates a flow chart of operations to increase the capacity of a switching node 101-*i*, according to an exemplary embodiment of this invention. A backplane (314 in FIGS. 2, 4 and 6) is provided that supports two switching cores in action box 1802. In action box 1804, one switching core card is provisioned. In action box 1806, a plurality of line and trib cards are inserted and non-blocking paths through the switching node are set in action box 1808.

In action box 1810, a second switching core card is added. A plurality of high capacity line and trib cards are then exchanged for previously provisioned line and trib cards in action box 1812. A non-blocking path is set for each signal (old and new) in action box 1814. A determination is made in decision diamond 1816 whether any further high capacity line and/or trib cards may be exchanged for previously provisioned line and trib cards. If further high capacity cards may be exchanged, processing proceeds back to action box 1812. If, in decision diamond 1816, no further high capacity line and/or trib cards may be added, then switching node 101-*i* is fully provisioned and no further changes are possible (box 1818).

It is to be understood that the above-described embodiment is merely illustrative of the present invention and that many variations of the above-described embodiment can be devised by one skilled in the art without departing from the scope of the invention. For example, it is well know in the art that switching systems usually have 1+1 sparing configurations. It is within the scope of one skilled in the art to make and use such a switching system after studying this specification. It is therefore intended that such variations be included within the scope of the following claims and their equivalents.

What is claimed is:

1. A telecommunications switching node comprising:
   a plurality of input/output (I/O) ports configured to receive and transmit telecommunications signals;
   a switching core comprising a plurality of switching networks, the plurality of switching networks comprising:
      a north switching network coupled to a first line which traverses only the north switching network in a first direction; and
      a south switching network coupled to a second line which traverses only the south switching network in a second direction opposite the first direction; and
   a backplane connecting each of said plurality of I/O ports to each of said switching networks in said switching core to effect a non-blocking path for each communications signal from any of said I/O ports to any of said I/O ports via at least one of said switching networks in said switching core.

2. The telecommunications switching system of claim 1 wherein said switching system effects a non-blocking path via all of said switching networks in said switching core.

3. The telecommunications switching system of claim 1 wherein said switching core comprises a pair of switching networks.

4. The telecommunications switching system of claim 1 wherein said switching core comprises two pairs of switching networks.

5. The telecommunications switching system of claim 4 wherein one or more of said plurality of I/O ports includes a switching network to effect connection through said backplane to both pairs of switching networks.

6. The telecommunications switching system of claim 5 wherein all of said plurality of I/O ports includes a switching network to effect connection through said backplane to both pairs of switching networks.

7. A method for increasing a capacity of a switching node, the method comprising:
   providing a first switching core comprising a first plurality of switching networks;
   providing a second switching core comprising a second plurality of switching networks; and
   providing a backplane with connections from each of the first and second pluralities of switching networks of the first and second switching cores to each of a plurality of I/O ports configured to receive and transmit telecommunications signals, wherein the connections among the switching networks and the I/O ports effect a non-blocking path for each communications signal from any of said I/O ports to any of said I/O ports via at least one of the switching networks in at least one of the switching cores.

8. The method of claim 7, further comprising providing a plurality of line cards at the I/O ports of the backplane for at least the first switching core.

9. The method of claim 7, further comprising providing a plurality of tributary cards at the I/O ports of the backplane for at least the first switching core.

10. The method of claim 7, further comprising exchanging a plurality of high capacity line and tributary cards for a plurality of previously provisioned line and tributary cards.

11. The method of claim 10, further comprising fully provisioning the switching node with the high capacity line and tributary cards for the first and second switching cores.

12. The method of claim 7, further comprising:
   deciding which of the first and second switching cores provides a more accurate signal; and
   using the switching core with the more accurate signal.

13. A method for providing a telecommunications switching node, the method comprising:
   providing a switching core comprising a plurality of switching networks, the plurality of switching networks comprising:
      a north switching network coupled to a first line which traverses only the north switching network in a first direction; and
      a south switching network coupled to a second line which traverses only the south switching network in a second direction opposite the first direction;
   providing a plurality of input/output (I/O) ports configured to receive and transmit telecommunications signals;
   providing a backplane connecting each of the plurality of I/O ports to each of the north and south switching networks in the switching core to effect a non-blocking path for each telecommunications signal from any of the I/O ports to any of the I/O ports via at least one of the north and south switching networks in the switching core.

14. The method of claim 13, further comprising expanding a capacity of the telecommunications switching node.

15. The method of claim 14, further comprising adding a second switching core, the second switching core comprising:
   a second north switching network coupled to the first line which traverses only the second north switching network of the second switching core in the first direction; and
   a second south switching network coupled to the second line which traverses only the south switching network of the second switching core in the second direction opposite the first direction.

16. The method of claim 15, wherein adding the second switching network core doubles an original capacity of the telecommunications switching node.

17. The method of claim 16, further comprising exchanging a plurality of high capacity line and tributary cards for a plurality of previously provisioned line and tributary cards.

* * * * *